(12) United States Patent
Sleep et al.

(10) Patent No.: US 6,522,945 B2
(45) Date of Patent: Feb. 18, 2003

(54) CUSTOMER SPECIFIC PACKAGING LINE

(75) Inventors: Nicholas J. Sleep, Royston (GB);
Andrew H. Proudfoot, Royston (GB);
Stephen Owen, Royston (GB); Adrian Neil Bargh, Royston (GB); Michael Kennedy, Rahway, NJ (US)

(73) Assignee: Merck & Company, Inc., Rahway, NJ (US)

( * ) Notice: Subject to any disclaimer, the term of this patent is extended or adjusted under 35 U.S.C. 154(b) by 0 days.

(21) Appl. No.: 09/975,053

(22) Filed: Oct. 12, 2001

(65) Prior Publication Data

US 2002/0099467 A1 Jul. 25, 2002

Related U.S. Application Data

(62) Division of application No. 08/923,844, filed on Sep. 4, 1997, now Pat. No. 6,317,648.
(60) Provisional application No. 60/025,327, filed on Sep. 6, 1996.

(51) Int. Cl.[7] .............................................. G06F 17/00
(52) U.S. Cl. ....................... 700/225; 700/216; 700/244; 53/52; 53/53; 53/55; 53/493
(58) Field of Search ................................. 700/216, 225, 700/231, 244, 55; 53/52, 53, 64, 266.1, 281, 493

(56) References Cited

U.S. PATENT DOCUMENTS

| | | |
|---|---|---|
| 5,208,762 A | 5/1993 | Charhut et al. |
| 5,504,332 A | 4/1996 | Richmond et al. |
| 5,522,512 A | 6/1996 | Archer et al. |
| 5,533,606 A | 7/1996 | Yuyama |
| 5,660,305 A | 8/1997 | Lasher et al. |
| 5,671,592 A | 9/1997 | Yuyama et al. |
| 5,713,485 A | 2/1998 | Liff et al. |
| 5,713,487 A | 2/1998 | Coughlin |

(List continued on next page.)

FOREIGN PATENT DOCUMENTS

| | | |
|---|---|---|
| EP | 0517197 | 12/1992 |
| FR | 2670179 | 6/1992 |
| GB | 2256629 | 12/1992 |
| WO | WO95/30611 | 11/1995 |

Primary Examiner—Khoi H. Tran
(74) Attorney, Agent, or Firm—McDermott, Will & Emery

(57) ABSTRACT

An automated packaging line has capability of filling large and small orders, of one or more bottles, each bottle filled with a respective one of a plurality of different pharmaceutical tablets, in a single run. Structure is provided for filling orders for an individual consumer, for a pharmacist, and for a wholesaler, simultaneously, using differently sized bottles, and providing customized labels for each bottle. A flexible filler station simultaneously fills plural bottles with respective tablets. An intelligent data carrying puck carries each bottle, including therein information describing, among others, the bottle, the customer, the order, the pharmaceutical, the bottle size and label information. Puck handling stations (PHS) are dispersed throughout the line, to verify a number of operations implemented on the line and to reject a puck at the earliest opportunity, while permitting subsequent rejection by a subsequent PHS. The PHS units are substantially identical, with DIP switch modifying operation of the controlling software thereof to implement different features at different points on the line. The pucks are recycled after each pass along the line. An initializing PHS wipes clean the puck data storage and, in a fail safe operation, marks it as a reject. The flexible filler station must mark the puck acceptable. Each subsequent PHS, following the flexible filler station, following a capper and following a label printer, may reject the puck if marked as a reject or if failing to meet various criteria

15 Claims, 17 Drawing Sheets

U.S. PATENT DOCUMENTS

| | | |
|---|---|---|
| 5,720,154 A | 2/1998 | Lasher et al. |
| 5,751,581 A | 5/1998 | Tau et al. |
| 5,761,877 A | 6/1998 | Quandt |
| 5,765,606 A | 6/1998 | Takemasa et al. |
| 5,768,140 A | 6/1998 | Swarz et al. |
| 5,771,657 A | 6/1998 | Lasher et al. |
| 5,842,118 A | 11/1998 | Wood, Jr. .................... 455/101 |
| 5,850,187 A | 12/1998 | Carrender et al. ..... 340/825.54 |
| 6,317,648 B1 * | 11/2001 | Sleep et al. .................... 53/500 |
| 6,345,487 B1 * | 2/2002 | Luciano et al. ................ 53/147 |

* cited by examiner

CUSTOMER SPECIFIC PACKAGING LINE

This application is a divisional of application Ser. No. 08/923,844 filed Sep. 4, 1997 now U.S. Pat. No. 6,317,648, which claims Priority from Provisional Application Ser. No. 60/025,327 filed Sep. 6, 1996.

TECHNICAL FIELD

This invention relates to an automated packaging line for assembly line filling of different orders for different quantities of different products, in different lot sizes, for specific customers, and more particularly to a system and process for simultaneous packaging on a single production line of orders for different quantities of different medications for intermediate customers and for ultimate users of the medications.

BACKGROUND ART

Prior art systems have been proposed to fill tablet containers automatically. However, many containers are still manually filled at the pharmacy level based upon a given prescription. While the manual method of filling may provide an accurate and high quality prescription drug filled container, it is tedious, time consuming and expensive.

Moreover, packaging systems presently used at the manufacturer level are inflexible and incapable of filling individual orders, because of a lack in the prior art of any process or apparatus for communication of order specific information to various stations on a drug packaging line, for example. Thus, known tablet packing systems indeed pack only one tablet type at a time, using only one bottle size, providing only one count of tablets per bottle and applying only one type of pre-printed label to the bottle. Changeover of such lines to provide a new product, bottle or label thus takes from two to eight hours, losing a significant amount of production time. Because of such significant time losses, present manufacturing and packaging operations require very substantial quantities of a product (a minimum of 50,000 to 100,000 packages) to be packed in a particular format before changeover, with the consequential requirement for storage of large inventories in warehouses for progressive distribution. Thus, distribution of pharmaceutical products requires intermediate wholesalers who, in turn, supply specific retailers or pharmacies.

Thus, existing systems require holding of large inventories of packaged products at a number of points along a supply chain, resulting in time delays on the order of six months from manufacture of a table to dispensing of that tablet to a customer. Product expiration thus becomes of concern because of the existing methods of packaging tablets and the like.

Archer et al. U.S. Pat. No. 5,522,512 discloses an automatic system for continuously filling tablet containers, which is capable of automatically feeding, inspecting and diverting tablets based upon a predetermined set of parameters to provide a filled tablet container having the proper number and type of tablets therein. The device and method disclosed therein is particularly capable of sorting a continuous stream of tablets to automatically fill a container with a predetermined number of tablets such as prescription pills, for direct distribution. In the case of pharmaceuticals, the filled container is suitable for distribution to the user or wholesaler.

Charhut et al. U.S. Pat. No. 5,208,762 similarly attempts to reduce pharmacist involvement in prescription filling. However, the system disclosed therein is intended to operate at the retail pharmacy level, being only capable of filling about 1100 vials in a day. The system of the '762 patent requires a plurality of lines respectively provided for filling vials of different sizes. Each line includes an unscrambler for incoming vials and a modified Automatic Tablet Control (ATC) machine as a vial filler, and permits use of a plurality of such ATC machines in each line depending on drug mix and drug volume required by the institution. A known labeler and a known capper operate on the filled vials and an accumulator sorts and ejects vials having an improper drug count, unreadable labels or improperly seated caps.

However, in the '762 system data flow relating to the patient (i.e., consumer, or customer) order information, and to the status of the order at any stage in the process, as well as to the various safety checks implemented therein, is maintained and controlled by a central control system. Such an approach is extremely limiting of the line processing speed and capacity, as a single control unit must keep track of each of a large number of operational steps for each of the vials being processed. There is no provision for autonomous control of various line operations at the individual stations and components of the line, as all order information is centrally maintained and processed.

The contents of the above described prior art, including particularly the Archer et al. U.S. Pat. No. 5,522,512, are hereby incorporated by reference.

The above described art, however, fails to provide a fully automated system, operating at mass-production level of manufature, which is capable of filling individual customer orders as well as intermediate and wholesale level orders, with a capability of providing individually printed labels for each individual order and each individual bottle, where a single bottle may form an entire order, and with fill quality assurance at each step of the manufacturing process. Indeed, the described art is not capable of eliminating requirements for intermediate storage of the packaged tablets, or other products, at a warehouse level.

The inventors have thus discovered a deficiency in the prior art with respect to a failure to provide assembly line filling of individual customer orders, as well as of intermediate and wholesale level orders, at a mass-production level of processing which has the capability to provide individually printed labels for each individual order whether it comprises a plurality of bottles or a single bottle, with full quality assurance at each step of the manufacturing process. Indeed, the described art does not eliminate requirements for intermediate storage of the packaged tablets, or other products, at a warehouse level and thus requires a complex product distribution system, from manufacturer to storage to shipping for distribution to intermediate storage to wholesaler (and storage) to dispenser (and storage) and only finally to the direct consumer.

DISCLOSURE OF THE INVENTION

It is accordingly an object of the present invention to overcome the deficiencies of the prior art and to provide a customer specific packaging line operating at a mass production level, for filling a plurality of different orders for different quantities of different tablets or other products in one run, for properly and individually labeling the filled orders and for providing full quality control and assurance at each step of the process prior to shipping the filled orders directly to the ordering customer, thereby to provide a complete and automated packaging-to-shipping system for packaging different orders on a single line and for shipping the packaged orders to the customer.

It is a more specific object of the invention to provide a customer specific packaging line allowing individual and multiple specific orders to be processed simultaneously, on a mass production, assembly line basis.

It is another and still more particular object of the invention to provide such a customer specific packaging line for simultaneously filling, in a single process, a plurality of different prescriptions, for different quantities of different medications for different consumers and intermediate customers.

It is yet another object of the invention to improve efficiency by reducing expenses, time and facilities necessary to provide medications to a consumer by replacing existing packaging-to-inventory-to-shipping operations with a packaging-to-shipping operation.

Another object of the invention is to provide such a customer specific packaging line for simultaneously filling different prescription bottles with a plurality of different prescriptions, for different quantities of different medications for different consumers and intermediate customers, and to provide for assembly line preparation and affixation, to the corresponding prescription bottles, of proper labels, respectively corresponding to and identifying the different prescriptions contained therein.

It is still a more specific object of the invention to provide a system configured to receive at its inputs bulk quantities of tablets, empty bottles, caps and unprinted labels and to provide at its output a plurality of correctly and individually labeled bottles containing a precise prescription for each customer or consumer, while simultaneously processing several medications on the same line.

It is yet another object of the invention to provide a customer specific packaging line in which different containers for the product being packaged are carried down the line by data carrying pucks, which are used to track each order through the system, where the pucks may carry data in a read-only or in a readable-and-writable form.

A further object of the invention is to provide carrying devices for carrying a plurality of individual medication containers to be filled along a packaging line in accordance with individual respective orders, in which the carrying devices include apparatus for carrying data identifying the specific order, along with security check data.

Still another object of the invention is to provide a customer specific packaging line for simultaneously filling, in a single process, a plurality of containers for different prescriptions for medicinal tablets, while maintaining an ability to provide 100% inspection of the tablets and up to 100% inspection of the labels affixed to the containers, while enabling product changeover in the line in times that could be as short as 20 minutes, monitoring line operations and performance through a single interface, and using a minimal number of operators.

It is an additional object of the invention to provide a customer specific packaging line which receives as inputs a plurality of differently sized containers, a plurality of closures corresponding to the different containers, a plurality of different products to fill the different containers in different quantities, and a plurality of labels for affixation to the containers, and input data identifying a number of individual orders for individual amounts of individual products, and which produces in an automatic assembly line filled and labeled containers including order specific quantities of order specified product, with successive containers having individually determined types and quantities of product in accordance with corresponding successive individual orders, said containers having individually prepared labels affixed thereto identifying the type and quantity of product contained therein, and further identifying a customer for whom the order was prepared.

In accordance with several of the foregoing objects, the present invention provides an automated container filling system, including a container input station and a container filling station, a fill control means for controlling the container filling station to fill any of a plurality of containers with any of a plurality of medications, and a plurality of tag means each capable of containing medication order information. In this embodiment of the invention, a respective one of the tag means is associated with each respective container for conveying respective order information for the respective container to the fill control means, the fill control means operating in response to the respective order information from the respective tag means by controlling the container filling station to fill the respective container associated with the respective tag means with a respective medication prescribed in the respective order.

In an alternative embodiment, the read-only tag means may abe used, each of which conveys information identifying the respective container associated therewith. In this embodiment of the invention, order and routing information is generated in response to the information from the tag means.

Moreover, in accordance with another aspect of the invention there is provided a method of operating a packaging line for mass production of packaged containers to implement an automated packaging-to-shipping system, comprising the steps of, in a single run, automatically packaging different orders for different quantities of different products in containers, and automatically labeling individual containers to identify quantity and product packaged therein, thereby providing individual orders for shipping to individual customers.

These and other objects, features and advantages of the present invention will become readily apparent to those skilled in the art from the following description and drawings, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated into and forming a part of the specification, illustrate several aspects of a preferred embodiment of the present invention and, together with the description, serve to explain the principles of the invention. In the drawings.

BEST MODE FOR CARRYING OUT THE INVENTION

Overview

Figure 1:
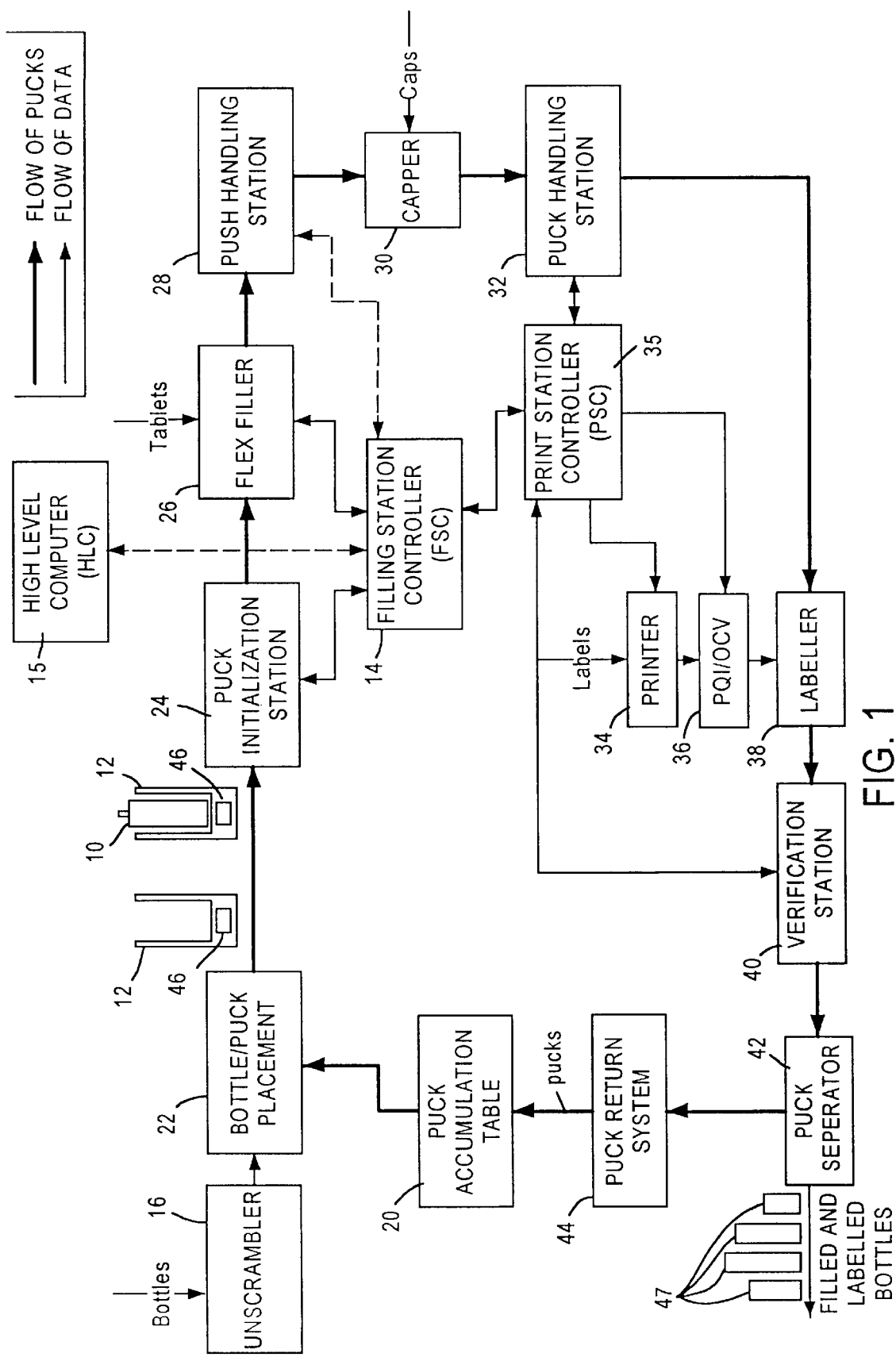
FIG. 1 provides an overview of the inventive system, in block diagram form illustrating a configuration of various control devices used in the invention.

Referring now to the drawings, there is shown in FIG. 1 a block diagram illustrating a packaging-to-shipping operation for filling a plurality of individual and different orders for different medications in accordance with the invention. The operation is implemented by the inventive Customer-Specific-Packaging-Line (CSPL). In the illustrated system, empty product containers, which are shown as vials or bottles 10 as are typically used in a system for packaging medicinal tablets, are fed down the line in data carrying pucks 12, which are used to convey each bottle to various stations of the line and to track each order through the system. At its output, the CSPL provides filled and labeled bottles 47. The invention is applicable to any type of product container appropriate to the proudct being packaged. For brevity, all such containers are referenced as "bottles" in the following description.

Figure 2:
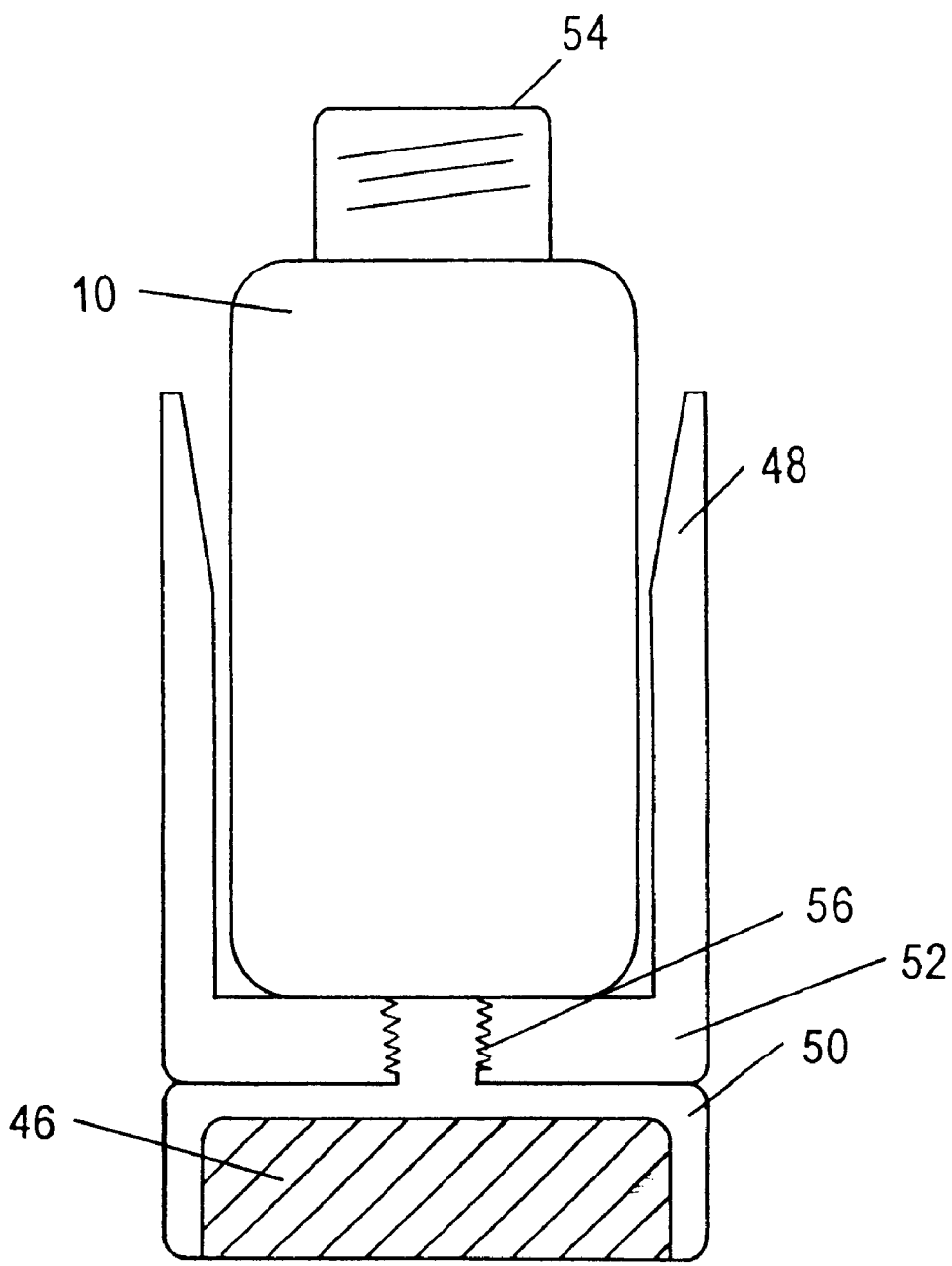
FIG. 2 shows a puck used to carry a bottle through the packaging line of the invention.

Pucks 12, which are more fully described in conjunction with FIG. 2, implement a key feature of the invention. In the preferred embodiment, the pucks carry data identifying the required contents of each bottle, the specific order of which it is a part, along with security check data. The data is stored in the pucks, and is read at each station along the line. At a filling station (subsequently described) data an also be written into the puck's storage to provide particular information relating to the tablets filled in the bottle, as well as all other order data. In addition to providing order or bottle-specific information, the puck is uniquely designed to carry the bottle so that its top is at a uniform height, so that differently sized bottles may be filled without modification of a filling station; may be capped with minimal change of a capping station; and may be labeled with only a minimal modification of a printing station.

Another key to the invention resides in provision of a number of puck handling stations (PHS), at various points along the line. Each respective PHS (either preceding or following respective stations of the line) communicates with its respective station, to provide to that station information necessary to implement the specific operation required thereof to complete the specific order for the bottle carried by the puck. The PHS units also include input controls for operator inputs. Various operator input switches or panels are provided to permit an operator to interact with the PHS and to modify the PHS operation in accordance with the flowcharts provided herein. Such control switches and inputs are also provided on the various stations, as will be understood from the following descriptions. The PHS units are substantially uniformly designed for communicating with the pucks—each being designed to read information from the puck—as well as for receiving (and responding to) various operator inputs. Operation of the PHS units is further described in the various flowcharts and state transition diagrams provided herein and the accompanying text.

In FIG. 1, movement of pucks 12 is shown by the bold arrows while flow of data and control is shown by the lighter, dotted, arrows.

In the presently preferred embodiment of the invention data is written to the pucks only at PHS 24 and while filling the containers at the flex filler 26. However, it should be appreciated that the CSPL structure may be modified to use a plurality of PHS units each of which has a capability or function of writing to the puck. Any PHS which writes information to the puck thus informs succeeding line stations of operations completed along the line in filling the order, or of operations which need to be performed. In such an alternate embodiment, the puck may thus include a history of what has been done with the bottle in its passage through the CSPL. In yet another alternate embodiment, the pucks may be of a read-only type, to which data is not written by any element of the line.

The puck handling stations each include puck intake, puck transport, and puck discharge elements, for providing the puck to a station of the line or to reject the puck on detection of a failure. The nature of the PHS will be further appreciated from the detailed description provided hereinbelow.

The CSPL further includes the following components.

A Filling Station Controller (FSC) 14 provides overall control of the line under supervision of a high level computer (HLC) 15. An unscrambler 16 feeds bottles to be filled, which are provided thereto from a bulk supply (not shown). A puck accumulation table 20 receives pucks for use with the bottles to be filled. A bottle placement station 22 places bottles into the pucks. A puck initialization station 24 (a PHS) initializes the pucks by removing previous data from the puck, thereby allowing the pucks to be reused. A flexible filler ("flex filler") 26 fills the bottles with tablets provided thereto. Flex filler 26 inspects every tablet for size, shape and color, and counts the correct number of tablets placed into each bottle. A puck handling station 28 (a PHS) rejects any misfilled bottles. A capper 30 caps the filled bottles using caps supplied thereto. A prelabeler PHS 32 rejects any uncapped or improperly capped bottles and reads data from the puck. An on-line on-demand printer 34 prints customized labels for each bottle of each customer order using blank labels provided thereto. The labels are supplied to the printer in a blank roll, although it is also possible to provide the labels to the printer individually. The printer is under control and supervision of a Print Station Controller (PSC) 35 and may print the label information in both a human readable form and as a barcode. The PSC also receives order and bottle information from the FSC 14. A Print Quality Inspection (PQI) and Optical Character Verification (OCV)

system 36 checks each label for print quality and correct data. A labeler 38 applies labels to bottles, rejecting any which have failed the PQI or OCV checks. A post labeling verification station 40 verifies the labels, by comparing the printed barcode on the bottle with the information stored on the puck. A de-pucker 42 removes the bottles from their pucks, and a puck return system 44 recycles the separated pucks back to the puck accumulation table for carrying another bottle to be filled.

In the illustrated inventive system, bottles are fed into the system using a centrifugal unscrambler of a known type (such as described in the aforementioned U.S. Pat. No. 5,208,762), although other types of unscramblers may be used, such as vibratory unscramblers for example. The unscrambled bottles are then automatically placed in the puck carriers. It should be appreciated that containers other than bottles are contemplated and are within the scope of the invention, which relates more broadly to provision of a single line for filling of an arbitrary container type with any of a plurality of products or materials specific to a particular order. Moreover, the specific form of the devices used to carry the containers is not limited to the puck structure illustrated in the drawings herein. It should be appreciated, however, that the illustrated puck structure is designed for use in conveying the bottles for filling with prescription medications by use of the described system. Thus, the puck structure according to the invention is advantageously capable of carrying differently sized bottles (containers) at a uniform height to the filler discharge nozzles, permitting bottles of varying sizes to be filled by a particular filler apparatus, wherein the filler discharges tablets at a fixed height within the filling station. Nonetheless, other carrying devices may be used. Moreover, for appropriately configured containers, the inventive concept may be utilized without such a puck or carrier structure, for example by attaching a reusable or disposable data carrying element to the containers themselves.

Embedded within the pucks are data carrying elements 46, storing data which uniquely identify the bottle carried thereby, and to which customer- and/or consumer specific data can be written. In the presently preferred embodiment of the invention, known radio frequency (RF) tags are used as the data carrying elements 46. As is known, such RF tags may be queried and written to without physical contact, and include a data storage device thereon, such as a memory chip, a magnetic recording device, or the like.

It is within the scope of the invention to use any data carrying element to carry the containers, preferably data carriers of a type which may be queried or written to in a non-contact fashion (i.e., without requiring wiring to be connected thereto for data transfer). As above noted, for containers which can be filled without requiring a special positioning configuration of a carrying device, it is possible to apply a data carrying element to the container directly. Such a data carrier (not necessarily an RF tag) may be subsequently detached for reuse on the Line, or may remain on the container throughout processing, and even after shipping. Leaving the data carrier on the container may be practical when data is pre-written in the data carrying element, for a line configuration wherein the CSPL only reads data from the data carrier as the bottle passes therethrough. For example, if an optically readable tag is pre-printed with identifying data, such as a barcode, an individually generated barcode label may be affixed to the bottle for use during processing. Moreover, providing that appropriate care is taken to manage and manipulate necessary wiring, even tags or other data carriers which require contact or wiring, for reading/writing data may be used.

Figure 10:
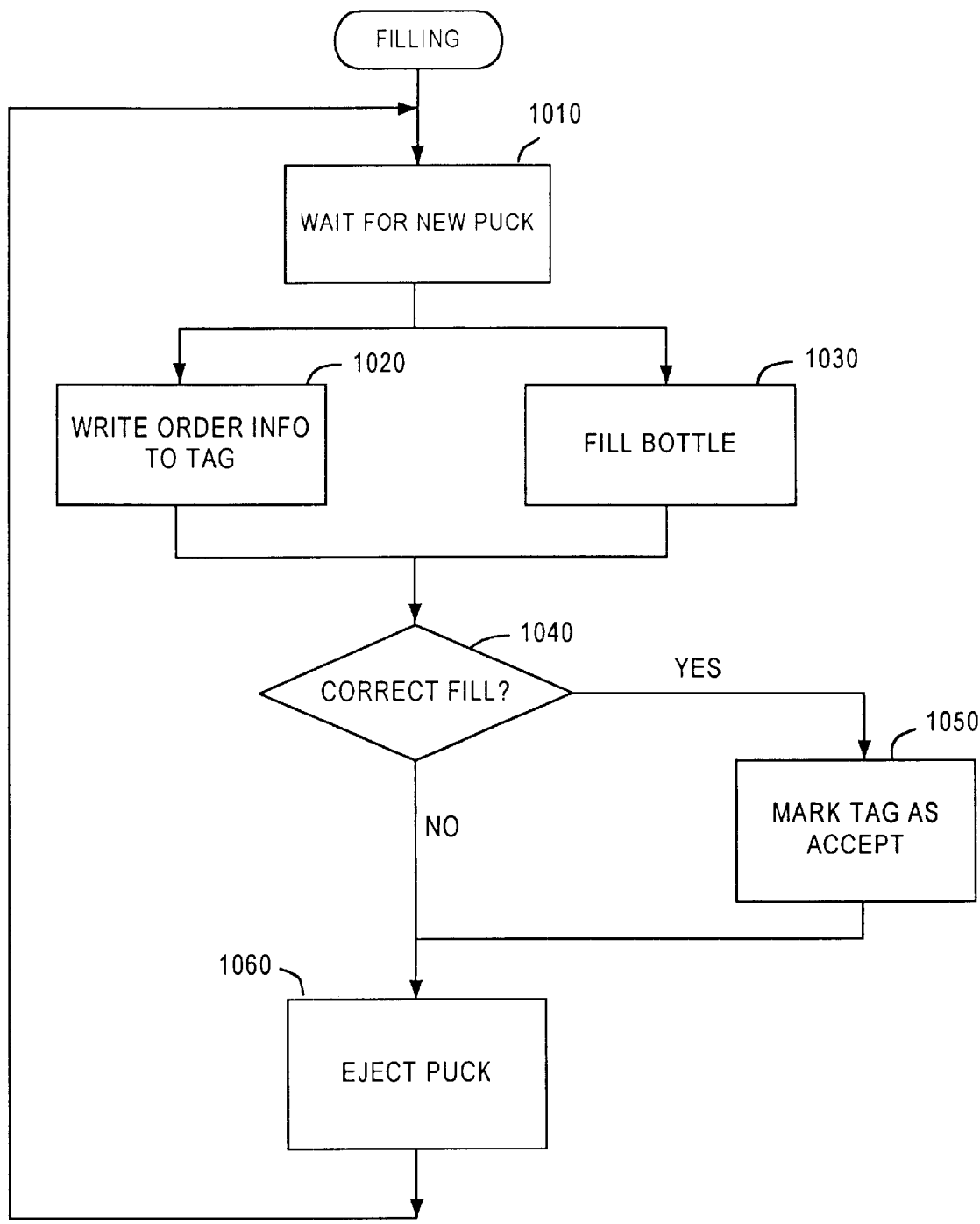
FIG. 10 provides a flowchart for operation of flexible filler station 26 under control of the filling station controller 14 in accordance with the invention.

In accordance with the invention, the bottles 10 are transported by a conveyor belt, slatted or otherwise, from the unscrambler 16 to enter the flex filler 26, which receives a customer specific order from a database maintained by HLC 15 communicating with FSC 14. Under control of FSC 14, flex filler 26 fills the bottles with the correct number of inspected tablets, and simultaneously writes the customer specific data to the puck's RF Tag 46, as illustrated in the flowchart of FIG. 10. Where different bottle sizes are to be filled simultaneously on the line, there is provided a specific bottle unscrambler and conveyor for each bottle size, each of the plural conveyors coming to a common filling station.

It is contemplated that a filler module, such as described in the aforementioned Archer et al. U.S. Pat. No. 5,522,512, be used in the tablet filling station of the invention, with appropriate modifications. As disclosed therein, a single module of such a flexible tablet filler may be configured to provide 4 individual channels for feeding tablets to the bottles. Such a filler module can operate at an overall throughput of up to 4,000 tablets/minute. As specifically disclosed in the '512 patent, in the automatic tablet filling system thereof tablets are fed from a hopper using vibratory feeders onto a single conveyor belt and past an Inspection System Module (ISM). Once inspected using a number of line scan cameras, the tablets are sorted for recycle, rejection or bottle filling.

The system disclosed herein provides four separate belts, which are kept separate by a barrier system to provide four separate conveyor belts to improve product separation, so that each of the four lines of the filler can package a different tablet.

The inspection system of the '512 patent uses three line scan cameras. A first camera (e.g., a known 1024 element high resolution TDI CCD camera) provides data on shape and size (area) as well as on one of three colors (green, for example). Two additional known 256 element CCD cameras (of medium resolution) provide data on the other two colors (e.g., red and blue). The inspection system thus inspects the tablets as they pass on the belt to check that the tablets are of the correct color, shape and size (area). A byproduct of such a check is a determination of tablet damage and any deviation from nominal tablet characteristics.

It will be understood that, for a 100 tablets/bottle count, 35 bottles/minute can be processed by such a filler. Lower tablet counts give higher bottle rates, up to a maximum in excess of 80 bottles/minute. Four (or more) tablet filling modules may be connected in series to give a combined feed rate up to 16,000 tablets/minute (or more), equivalent to more than 120 bottles/minute (or more) at 100 tablets/bottle fill.

The four channels of the flex filler module are separate from each other, and are connected to separate storage bins for the tablets. Thus, the single module may fill any bottle on the line with any of up to four different products. In the presently contemplated utilization of the inventive system, for filling containers with drug tablets according to a specific prescription. Only one tablet type will be filled into each container. However, when used to fill bottles with other products, it should be appreciated that different products may be filled into a single bottle. For example, variety packages of various products may be filled with the aid of the inventive CSPL.

When the CSPL is used for filling bottles with one of a number of different tablet types, changing the type of tablet being filled is reduced to a simple task of changing the appropriate assemblies of the flex-filler 26, with appropriate decontamination procedures to assure that no residue of the previously dispensed tablets remains in the filling channel for the new tablets to be dispensed thereby. In a channel, vibratory feeders and a conveyor belt convey tablets from a storage hopper into a tablet diverting mechanism and thence to a bottle or recycle/reject bin. These parts (which contact product dust) are removed when changing the type of tablet being dispensed or for repair. Only the non-contacting portions, such as the light, analysis, computing and similar components (as well as the other unchanged dispensers) remain in the filler. Thus, modular replacement makes possible a simple, efficient, and straightforward replacement of product being dispensed at a minimum of lost production time.

It should be appreciated that each filling channel within the flex filler 26 has at its input its own puck intake system, to include a transmitter/receiver for writing/reading data to and from the puck.

After filling, the bottle exits the flex filler. In the preferred embodiment, PHS 28 inspects the RF tags so that incorrectly filled bottles are rejected at this stage. It will be appreciated that provision for rejection is also made at other stages of the line, as all PHS units have the capability of bottle rejection.

After exiting PHS 28, the bottle is capped by a known capper 30 (such as described in the aforementioned U.S. Pat. No. 5,208,762). Two paths can be provided at PHS 28 to route the bottles to one of two cappers to apply either of two types of cap—for example, child resistant or standard—to a bottle in accordance with the specific order information carried by the puck. Moreover, where several bottle sizes are being filled by the line, several cappers may be provided, each applying caps of a specific size to appropriate bottles. Thus, the bottle may abe diverted to any of several size-determined branches, in accordance with size information provided thereto by the puck 12 associated with a bottle exiting from flex filler 26. At each of the size dependent branches, a capper 30 applies the appropriate cap.

After capping, bottles from the two capping streams are recombined and the bottles and pucks then proceed to the labeler, where the prelabeler PHS 32 reads the customer specific data carried on the puck and provides the data to PSC 35 to control printer 34 to print a label. By previously diverting and rejecting improperly filled, improperly capped, or other defective bottles, so that labels are printed only for bottles being shipped, and by providing individualized label printing only after the bottles are filled. the inventive system can thus take care of all label accounting requirements (label control requirements) imposed by the Food and Drug Administration. The post-filling and individualized label printing thus provides a significant advance over the prior art use of a roll of preprinted labels. While the prior art approach requires close scrutiny to meet regulatory requirements and to assure product integrity, the inventive approach virtually eliminates concerns in this regard, thus reducing the time, labor and expense of record keeping for labels.

The print quality is verified at the PQI and OCV station 36. The verified label is then applied to the bottle by a known labeler 38 before the labeled bottle, still carried within the puck, proceeds down the packaging line. At station 40 the RF tag 36 is read and its data compared with the bar code printed on the label. If an error is detected at this stage the bottle is discarded. Where the bar code of the label are verified as conforming to the RF tag data, after puck separation the bottle proceeds to a bottle shipping facility, where plural bottles of a common order may be combined and where orders are prepared for shipping to the ordering customer. After the bottle is separated from the puck, the puck is returned to the puck accumulation table 20 via the puck return system 44 and filled, labeled bottles (of various sizes) are outputted at 47.

The main line control task resides within the Filling Station Controller (FSC) 14, which communicates with HLC 15. The system gets various product orders from a database kept by HLC 15, tracks each customer specific order as it passes through the filling and labeling stations, and then reports back to the high level computer system the successful completion of the orders.

Although the present embodiment of the invention uses only one size of bottle at any one time, and is capable of being changed over among various bottle sizes with minimal effort, it should be appreciated that with straightforward modification a system according to the invention is also capable of handling various bottle sizes simultaneously in a single operation, thereby filling orders into any of the differently sized bottles in a single process, when appropriately sized pucks are provided for the differently sized bottles.

As one example, three sizes of bottles (30 ml, 75 ml and 120 ml) may be handled simultaneously. As noted above, where multiple bottle sizes are handled on the same line puck handling station 28 separates the differently sized bottles to separate line branches, directed to the separate cappers for the differently sized bottles. A similar approach may be used for labeling differently sized bottles. That is, a different labeler may be used for each different bottle size, with prelabeler PHS 32 routing the differently sized bottles to different line branches for labeling by specific labelers. Additional equipment would also be required to route correctly sized bottles to each of the filling lanes.

After capping, the output branches from the cappers direct the bottles to a recombined line at prelabeler PHS 32. As previously noted, the single module flexible tablet filler 26 has four individual channels, each capable of feeding a different tablet type, so that up to four products may be run and filled simultaneously on a single line using one flex filler module 26, and any of up to sixteen different products (tablets) may be used to fill bottles on a single line when four flex-filler modules are used. Advantageously, because of a modular construction of the flex filler, the filler channels can be changed over individually to provide the above described product changeover in the line. Such changing of a single channel may be accomplished in periods of time as short as 20 minutes or less.

Preferably, as a safety feature, the tablets which are used in the system are designed to be uniquely identifiable by various physical characteristics, such as shape, size, and color. Other characteristic features may also be relied upon for tablet differentiation, such as a score mark which aids the consumer in breaking the tablet. Additional differentiating tablet characteristics which may be relied upon include tablet hardness, coating, and dustiness. The tablets contemplated for use in the system are of the type produced by Merck Manufacturing Division, which are specifically designed to have several of the above described differentiating characteristics to differentiate and identify the tablets to users with poor eyesight, for example.

The set of characteristics of an individual tablet or capsule determines the degree of difficulty of feeding, counting and other inspection tasks, but also provides image differentiating features which are used in the flex filler 26 to identify the tablets and to assure that the order filled into a particular bottle 10 carried by a particular puck 12 is, in fact, the specific order identified by the data carrier 46 of that particular puck 12. This is accomplished by a process in which the individual channels of the modules of the flex filler are taught respective tablet images for particular tablet lots, and the tablet model is verified against a "master" tablet model, permanently stored on the filling station controller. It should be appreciated, however, that instead of the above described optical inspection or, indeed, the optical analysis, other methods may be used for tablet identification, such as photoacoustic spectroscopy or X-ray analysis. An approach well suited for the present invention is the use of NIR (near infrared) spectroscopy, as disclosed in U.S. Pat. No. 5,504,332, the contents of which are hereby explicitly incorporated by reference. Thus, on-line, real time content analysis may be used to identify the tablets, instead of (or along with) optical identification.

Thus, at a minimum the invention provides qualitative analysis to identify the drug content of the tablet and quantitative analysis to determine the amount.

The Puck

As previously noted, it is within the scope of the invention to provide pucks of varying sizes for carrying on one line various bottles of corresponding sizes. A structure currently preferred for a puck 12 used in the invention is shown in FIG. 2.

From the foregoing description, the puck shown in cross section in FIG. 2 is applied for tracking bottles and orders along a pharmaceutical packaging line which may be filling several different bottle sizes. Towards that end, puck 12 is structured for holding a bottle 10 therein. To enable flexibility of use, specifically to carry bottles of different sizes, the puck 12 is preferably a two-part structure, including a puck top portion 48 and a puck base 50. Although the illustrated structure provides a cylindrical top portion 48 with a tapered upper edge to permit ease of insertion of a bottle thereinto, it should be understood that the top portion need not be cylindrical and need not be tapered. Thus, the top portion 48 may have upstanding fingers arranged to accept a bottle of a specific size, may have curved portions of a cylinder, or flat upstanding portions, or any other arrangement and configuration for accepting and retaining a particular container of a particular size, whether a cylindrical bottle 10 or an otherwise shaped container.

Moreover, in addition to variation of the diameter of top portion 48 to accommodate differently sized bottles, the (vertical) thickness of a bottom section 52 of top portion 48 may also be different for different pucks, to accommodate bottles or other containers having different heights. Alternatively, shelf structures may be built in to the pucks at different heights to accommodate bottles of different heights and to place the necks thereof at a common height. As yet another alternative, inserts of different heights may be removably inserted into the pucks to provide the common height for the necks. These and other approaches provide a platform of individualized, variable, size in each puck (or group of pucks) to assure that a fill opening 54 of a container carried thereby is at the proper height to be filled by the tablet discharge chute of the flex filler 26. The common height is chosen to avoid a gap between bottle opening and discharge chute which is too large (and could permit tablets to fall outside the bottle, perhaps to jump in to a bottle at an adjacent discharge chute of the flex filler) or too small (and could cause the bottle top to jam against the filler discharge chute). Additional safety features include the provision of isolation between the discharge chutes of the flex filler to avoid any such mixing of product from adjacent chutes.

As illustrated by the threaded portion 56 at the bottom of top portion 48, a screw-threaded projection from base 50 is received therein. Of course, the threaded projection may extend from top portion 48 to be received in a threaded portion in base 50. Moreover, the coupling connection between top portion 48 and base 50 may use other fastening or connecting means. Thus, various differently sized puck tops may be attached to any given base, for transporting differently sized bottles therein to be positioned at an appropriate filling position, for example.

As previously described, the pharmaceutical packaging line of the invention operates for filling several drug types in parallel. Under such circumstances, it is of paramount concern that a customer does not receive an incorrect bottle, or a correct bottle with either an incorrect prescription or with an incorrect label. Towards that end, pucks 12 include the above described tags 46. In the preferred embodiment, tag 46 is enclosed within the base 50, although it is also possible to attach the tag to an external portion of the base, or to include the tag within, or attached to, top portion 48. For example, tag 46 may be within the bottom section 52 of top portion 48. Additionally, base 50 is shown as having a cylindrically tubular shape. However, the base may be solid, may include the tag in a single indentation or compartment therefor, or may be cylindrical to incorporate a disc-like tag therein.

The tag 46 used in the puck may be of the type commercially available under the designation Datalogic HS208R, or of any other suitable type. Such tags are presently used in car manufacturing, to identify features of a car being assembled in a large scale assembly line, but no suggestion is or has been made in the prior art to use RF tags for identifying individual prescriptions and orders in a pharmaceutical packaging line.

The tag includes an RF transmitter/receiver. An 8 K memory is preferably used within the puck for storage of data communicated via tag 46. However, the memory size clearly is a design parameter selected in accordance with the amount of data expected to be communicated to, and stored in, the puck. Advantageously, and preferably, the RF transmitter in the puck has a range on the order of only a few inches, thus permitting the use of a single frequency for receiving RF communication from each of the different pucks at each PHS without inter-puck interference. Of course, the identification data stored in the puck may also be used to encode or encrypt transmissions differently, thus further to differentiate among the numerous transmissions taking place in the system. As subsequently described herein, considerable care is taken in the PHS design to eliminate interpuck interference.

The structure of puck 12 thus permits operation of a line in accordance with the invention wherein, while the bottle is being filled, all information associated therewith is written to the puck's memory. The information written thereto includes all information required for labeling, as well as fill quantity and all relevant information. Additionally, various flags are written to the tag, such as the bottle's route through the system. If a bottle is correctly filled, its tag is marked as being good. Otherwise, the tag is marked as a reject, permitting rejection of the bottle either at the specific station or at a predesignated point along the line. Nonetheless, it is within the scope of the invention to use read-only tags, upon providing increased centralized control thereof. In an embodiment permitting writing to the tag, where all bottle data are stored on the tag additional down-stream processing steps can be added to the line without requiring complex communications with the FSC, as all the required data may be obtained directly from the tag 46. The puck thus provides a highly flexible line architecture, and minimizes redesign for any new line implementations.

Puck Handling Stations

As is apparent from the foregoing description, throughout the system there are provided several puck handling stations (PHS), each controlled by a processor programmed in accordance with the various flow charts provided herein and, where appropriate, generating requests for and responding to various operator inputs. ASIC's (application specific integrated circuits) are included in the generic term "processor". For example, puck initialization station 24, puck handling station 28, prelabeler puck reading station 32 and post labeling verification station 40 each utilize a PHS, with appropriate modifications to implement the specific functions of the particular station. The following description is provided to explain the common features of the various PHS units.

a) Bottle Handling

The PHS includes an indexing wheel controlled by a servo controller, various actuators and sensors, a puck reading system (using, for example, a Datalogic HS500 antenna to read tags) and an optional barcode reader. This design is provided in order to make it possible to reliably read data from a specific puck. The limitations of standard RF technology make it difficult, if not impossible, to differentiate between abutting pucks on a conveyor belt. Thus, the indexing wheel of the PHS provides a reliable mechanism to singulate the pucks for data reading. By indexing the pucks with the indexing wheel, all other pucks are effectively removed from the reading range of the PHS antenna reading the indexed puck.

Throughout the following discussion, positions in the indexing wheel will be referred to as follows:

First Position A: The infeed to the indexing wheel

Second Position B: The puck and optionally barcode reading position, where pucks can be rejected if necessary.

Third Position C: The normal outfeed position.

Fourth Position D: The alternate outfeed position, as used in diverting PHS units.

During normal operation at the standard station, a puck containing an embedded tag enters the indexing wheel in position A. The indexing wheel is then rotated counter-clockwise, taking the puck to position B where the tag is read. If the puck is invalid, it is rejected in this position by actuation of a cylinder to move it into a reject bin. Otherwise, the next time the wheel is indexed, the puck is taken around to the out-feed position C where it exits the station on an out-feed conveyor. On the next index, a summary of the data stored on the tag is serially transmitted to the PSC/FSC for order tracking.

A station may, optionally, be able to route pucks dependant on a routing bit in the tag data. In this case, a cylinder at the normal out-feed is able to extend and thus to prevent the puck from exiting at this position. Thus, the next time that the wheel indexes, the puck will continue round to exit at the alternate out-feed position D.

Additionally, a station may, optionally, be able to verify the barcode on a labeled bottle with respect to the intended barcode stored on the tag. This takes place at position B. If the barcode is not as is intended, the puck is rejected. If the bin for rejected pucks is not able to accomodate the rejected puck, the PHS illuminates a Reject Bin Full lamp.

At position B, bottles are rejected by extending and then retracting a double-acting cylinder with a spring catch to pull them into the reject bin. To prevent pucks from being forced out of the indexing wheel at this position during normal rotation, a spring holds them in the correct position. If the outfeed becomes full, the station stops feeding bottles until the outfeed clears again.

At position C, a double acting cylinder controls the gate to divert pucks to the alternate out-feed.

A significant feature of the invention is the capability provided for all stations to autonomously reject errant bottles based on the data contained on the tag, as well as to send unsolicited messages at any time to the FSC or PSC, as required. Though not previously mentioned, it should be understood that various known data verification and error detection correction steps are implemented along the line, such as providing checksums and variable field checksums on the puck tags. Thus, the following conditions provide sufficient cause for rejection:

a) WARNING reject causes (i.e. rejects which do not compromise line integrity):

Puck tag unreadable

Puck with Variable Field checksum that does not match tag data.

Puck with checksum that does not match tag data.

Missing Cap (for Labeler Infeed PHS only)

Missing bottle (other PHS units)

Puck from unknown diverter

Puck from unknown route

Puck with incorrect magic number from diverter (described hereinbelow)

Puck with incorrect label size for line

Puck with unreadable barcode (verification station)

Puck with incorrect barcode (verification station)

Tag too old (filler infeed PHS) and b) LINE MAJOR reject causes (i.e. rejects which do compromise line integrity):

Puck out of sequence (a puck for implementing a particular order is detected at a different point than expected in the sequence of pucks being processed).

b) Mechanical Design

Although not illustrated by a drawing, the following description provides full identification of the mechanical structure of a PHS. The generic Puck Handling Station (PHS) uses a 4 position index wheel to distance a puck from all other pucks by 150 mm (center to center) to enable the RF tag to be read reliably. The pucks enter at a first position, the infeed position of the index wheel, from a flat top chain conveyor. When indexed the puck is moved through 90° to the side of the conveyor and positioned at a second position above an RF antenna. If the puck is to be rejected it is moved into the reject bin from the second position. Pucks identified as being acceptable are indexed back onto a flat top chain conveyor and exit the PHS at a third position.

The PHS is made primarily from stainless steel suitable for regular clean down, and linished with 240 grit. It has adjustable feet to allow leveling after installation. The feet have free-rotating bases to avoid floor damage during adjustment.

The index wheel is fully guarded by a clear polycarbonate cover. Access to the index wheel is through an interlocked door. The index wheel is a 230 mm delrin disc and is driven from above by an Electro-Craft servo motor system via a 4:1 reduction timing belt. The index time is preferably about 100 ms.

Any faults (whether from an external E-stop/guard interlock or an internal position error) cause the index wheel to come to a controlled stop at maximum deceleration (less than 50 ms).

Two optical sensors are used to detect the presence of a puck at its first (infeed) position. A first sensor triggers when a puck is just about to enter the index perimeter, and the second sensor is triggered when a puck is fully located in the index wheel. At the second position (above the RF antenna), a sensor is used to detect the presence of a bottle. On the post-capper PHS 32 this sensor is repositioned to detect the presence of a cap on a bottle. The third (and fourth) position has a sensor to indicate that there are no pucks within the index perimeter.

Each PHS thus includes a mechanical puck handling device for accepting the bottles in pucks, for indexing the puck to read data from the RF tag of the puck, for passing the bottle to the Line and for rejecting the puck (and the bottle) when an error is detected. The reject mechanism preferably uses a sprung finger on a rodless pneumatic cylinder, and a reject bin with a capacity for approximately 10 pucks. When activated the sprung finger engages the puck to be rejected and drags it into the reject bin.

The PHS 28 is in communication with the FSC (filling station controller) 14. Thus, PHS 28 reads the puck data from the tag and checks the data for consistency, rejecting the puck if the puck is out of sequence, or is inconsistent with expected data. The processor of the PHS communicates with the local controller (e.g., FSC 14) to inform the system that a particular puck, for a particular order, has been rejected or is properly progressing along the line. Appropriate visual indicators (e.g., lamp indicators of various colors) are provided with the various PHS units to inform operators of the operational states thereof It is a feature of the CSPL that various stations along the line are provided with a capacity for rejecting the puck so that pucks can be rejected at varous points on the line. This capability is provided by the PHS associated with the stations. Thus, a puck is rejected as soon as possible, but each station conducts similar tests so that, if a rejectable condition is missed at one station, a subsequent station will reject the puck. Each PHS is connected to a higher level controller, such as the FSC or PSC.

The inventive system thus includes a number of PHS units, which are based on the Data Logic HS880B puck interface microcontroller. Standard PHS units are provided at the infeed of the printing station (32), as well as at the infeed to the filling station (the line start puck initializing station 24) where the pucks' storages are wiped clean and only rejected if faulty. Customized PHS units are provided at the outfeed of the filling station (28), where bottles may optionally be routed to alternative cappers based on puck data, and after the labeller (verification station 40), where the label's barcode is also checked and a match required for the barcode data with the puck data, and where provision is made to route bottles to a facility for collation of multiple-bottle orders. The bar code reader of verification PHS 40 scans at a rate of 500 times per second and has an integral decoder. The bottle is spun clockwise from above by a non-marking friction pad connected to a DC motor. The motor and pad are moved down to apply pressure to the cap by a fast response pneumatic actuator. Just prior to spinning, a sprung loaded centralizing ring ensures the concentricity of the bottle in the puck.

Figure 5:
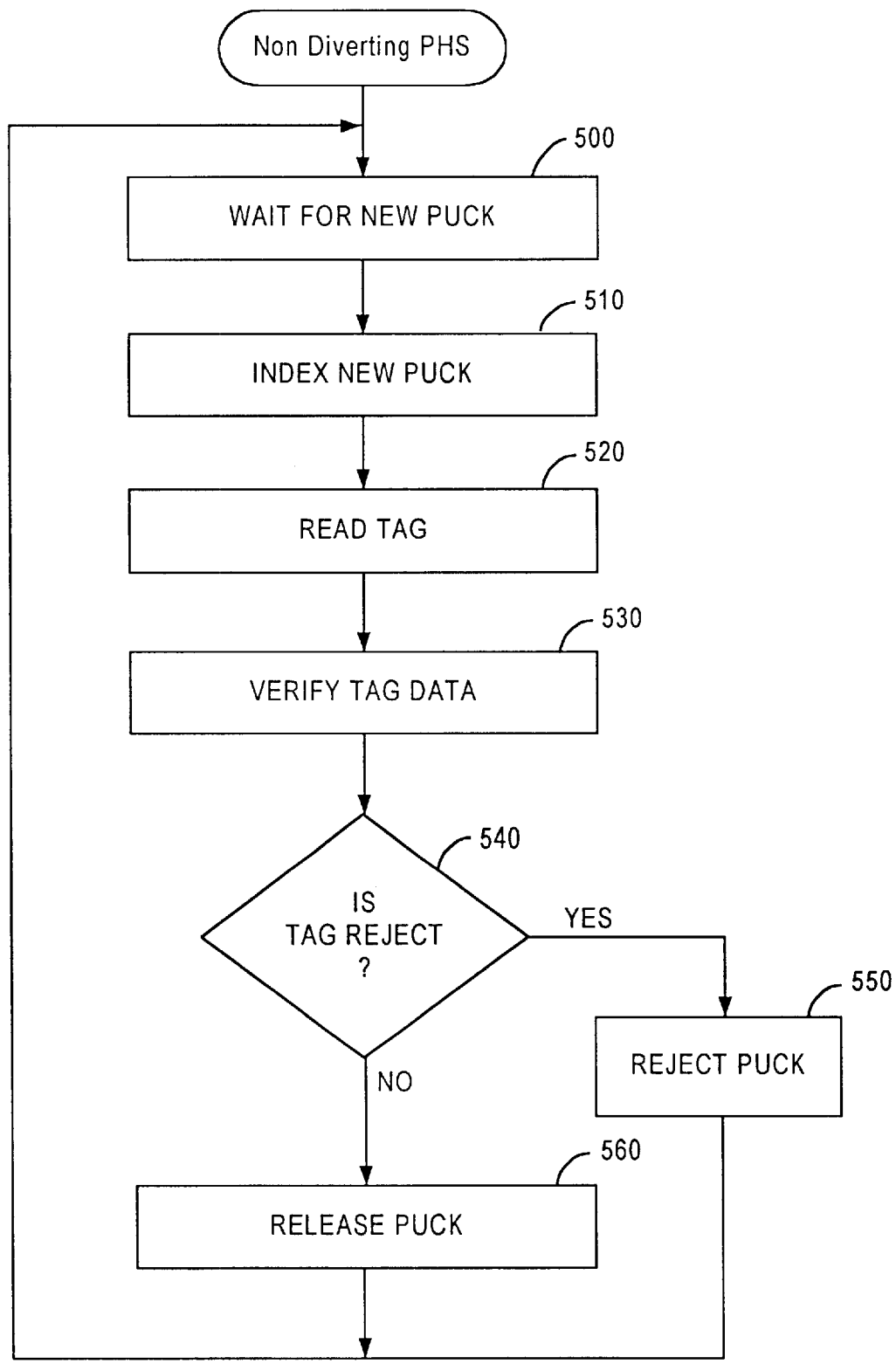
FIG. 5 provides a flowchart for operation of a non-diverting puck handling station (PHS) of the invention.
Figure 6:
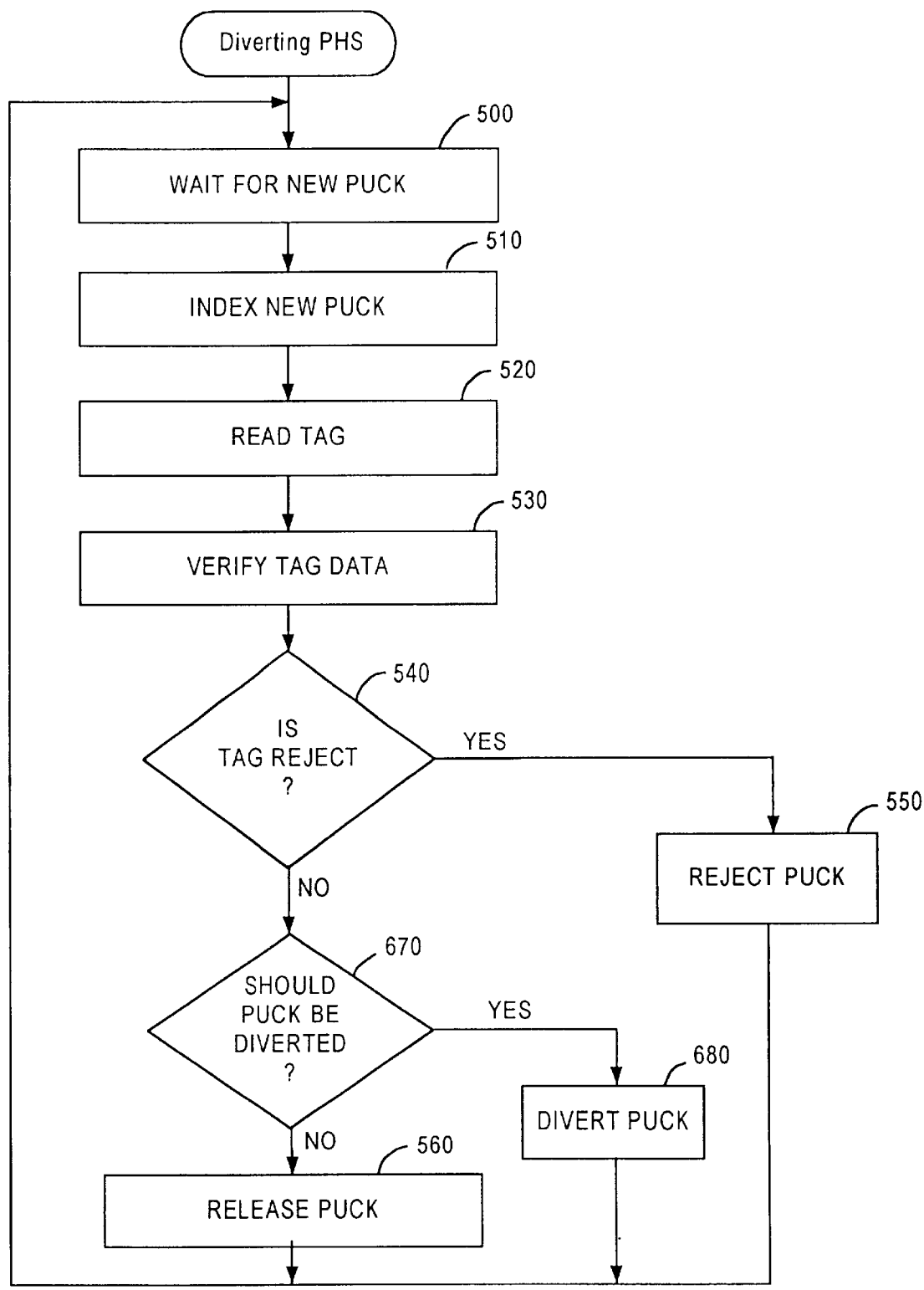
FIG. 6 provides a flowchart for operation of a diverting PHS of the invention.
Figure 7:
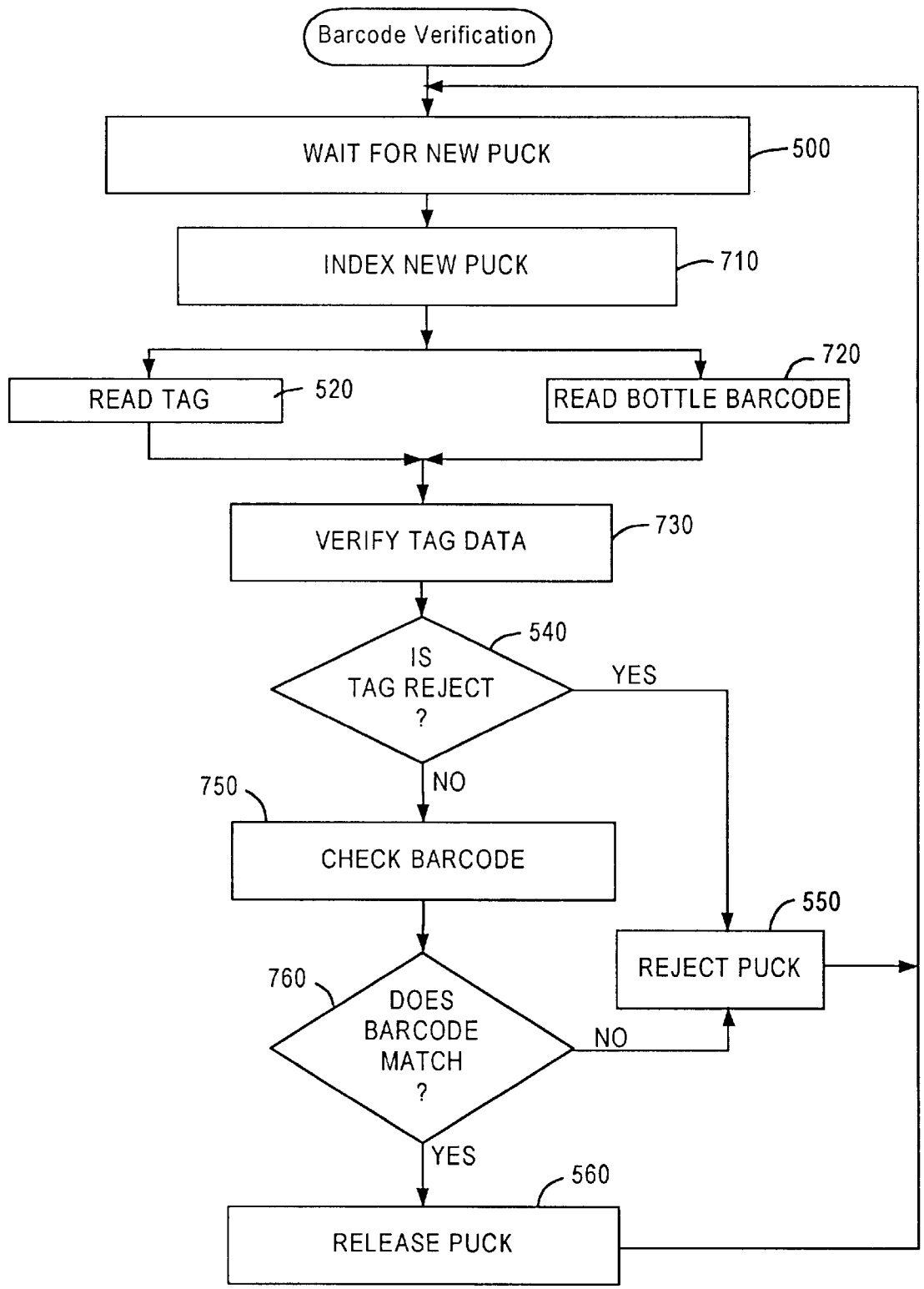
FIG. 7 shows a flowchart for operation of verification PHS 40 of the invention.

Each PHS controls the puck reader antenna, the rotating indexing wheel, and the reject mechanism thereof, as appreciated from the flow chart of FIG. 5, while custom stations may also control a barcode reader, as apparent from the flowchart of FIG. 7 and may provide an alternate outfeed, as apparent from the flowchart of FIG. 6.

Shown in FIG. 5 is the logical manner of operation of a PHS according to the invention. As shown therein, at step 500 the PHS awaits arrival of a next puck. Upon detection of the next puck, at step 510 the PHS indexes the puck, thus to separate the puck from other pucks adjacent thereto and to eliminate RF interpuck interference, so that the data stored in the puck may be read. Having indexed the puck, the PHS reads the tag data at step 520 and verifies the same at step 530. The data from the puck is checked to determine whether a reject code has been previously entered therein by a previous station along the line, as well as for comparison with the order data. Upon detecting a (previously entered) reject code, or upon detecting a data error at step 530, a reject decision is taken at step 540. Such a decision is also taken if it is determined that a puck is out of sequence. In either case, a puck rejection sequence, e.g., transfer to a reject line or station, is implemented at step 550. The PHS thus autonomously rejects any puck marked for rejection, which is out of sequence, or which has any of the previously mentioned fault conditions.

On the other hand, upon determining that no reject code had been previously entered and that no reason for rejection or sequence failure has been presently detected, the puck is released at step 560 to continue progress to the next station. Whether the puck is rejected at step 550 or released at step 560, the processor returns to step 500 to await arrival of the next puck to be processed.

FIG. 6 shows a flowchart similar to that of FIG. 5, to describe operation of a diverting puck handling station, such as may be used where two (or more) cappers or two (or more) labelers are used when differently sized bottles are filled by the CSPL. As previously noted, under such conditions two cappers (or two labelers) may be provided in parallel, each one applying caps (or labels) to bottles of a particular size. A diverting PHS thus operates in accordance with steps 500–550 of FIG. 5 but, in addition, includes a step 670 which determines whether or not the puck should be diverted. For example, bottles of a first size may be processed by a capper on a main branch of the line, while bottles of a second size may require processing by a capper located on a side branch of the line. The processor of a diverting PHS is thus programmed to read the bottle's route from the tag and, upon determining that the route includes the main branch (i.e., the bottle is the first size), to release the puck without diversion, by implementing step 560. On the other hand, upon determining that the route includes the side branch (i.e., the bottle is of the second size), step 670 transfers control to a step 680, which activates the various solenoids to divert the puck to the side branch of the line. Thereafter, the PHS processor returns to step 500 to await arrival of the next puck.

A diverting PHS may be used for various purposes, but is particularly contemplated for use in conjunction with a multiple-capper or multiple-labeler configuration, wherein a puck should be passed on to one of a plurality of cappers or to one of a plurality of labelers. A diverting PHS 40 achieves alternative puck routing by inhibiting the exit of pucks from an index wheel thereof at a first position and, instead, indexing the pucks to a second position where they are ejected. Pucks are retained in the first position by actuation of a pneumatic cylinder.

The fundamental operation of a PHS, whether diverting or non diverting, however, is applicable to each PHS used in the CSPL, and is thus used for the puck initialization PHS 24 and for the verification PHS 40, as well as for the PHS 28 and PHS 32.

However, the individual PHS units may incorporate specific further modifications as follows.

FIG. 7 shows a flowchart for operation of verification PHS 40, which verifies the label printed by printer 34 and applied by labeler 38. As shown therein, steps 500–560, or steps substantially corresponding thereto, are implemented in the barcode verification PHS. However, upon indexing the puck, PHS 40 reads both the puck data, at step 520, and the barcode data provided on the bottle label, at step 720. Accordingly, step 510 of FIGS. 5–6 is now shown as a different step 710, inasmuch as step 510 leads only to a single reading step 520 but step 710 leads to implementation of two steps, 520 and 720.

At step 730, the data read from the puck is verified, similarly to the operation in step 530. However, the puck data and the barcode data are verified and matched to each other. Thus, step 730 is somewhat different from step 530. Upon receiving the results of the verification step 730, step 540 determines whether or not the puck is to be rejected. Control is then transferred either to step 550, for rejecting the puck, or to step 750, at which point the barcode is checked against the puck data.

If the printed barcode data does not match the puck data, step 760 passes control to step 550, in order to reject the puck. Such a mismatch may occur for several reasons, including printing of the wrong information, printing of the correct information but erroneously applying the label, or provision of a defective (e.g., illegible) label, among others. The present system detects each such error by establishing a mismatch of the barcode and puck data at step 760. Thus, the puck is released at step 560 only if a proper, and legible label is applied to the proper bottle, which has been previously correctly filled without a reject code. Though not explicitly shown, all PHS units (24, 23, 32, 40) report on any bottles (pucks) to their controllingcomputer (e.g., PSC 35 or FSC 14). Indeed, the PHS reports on all bottles to the PSC or FSC.

Figure 8:
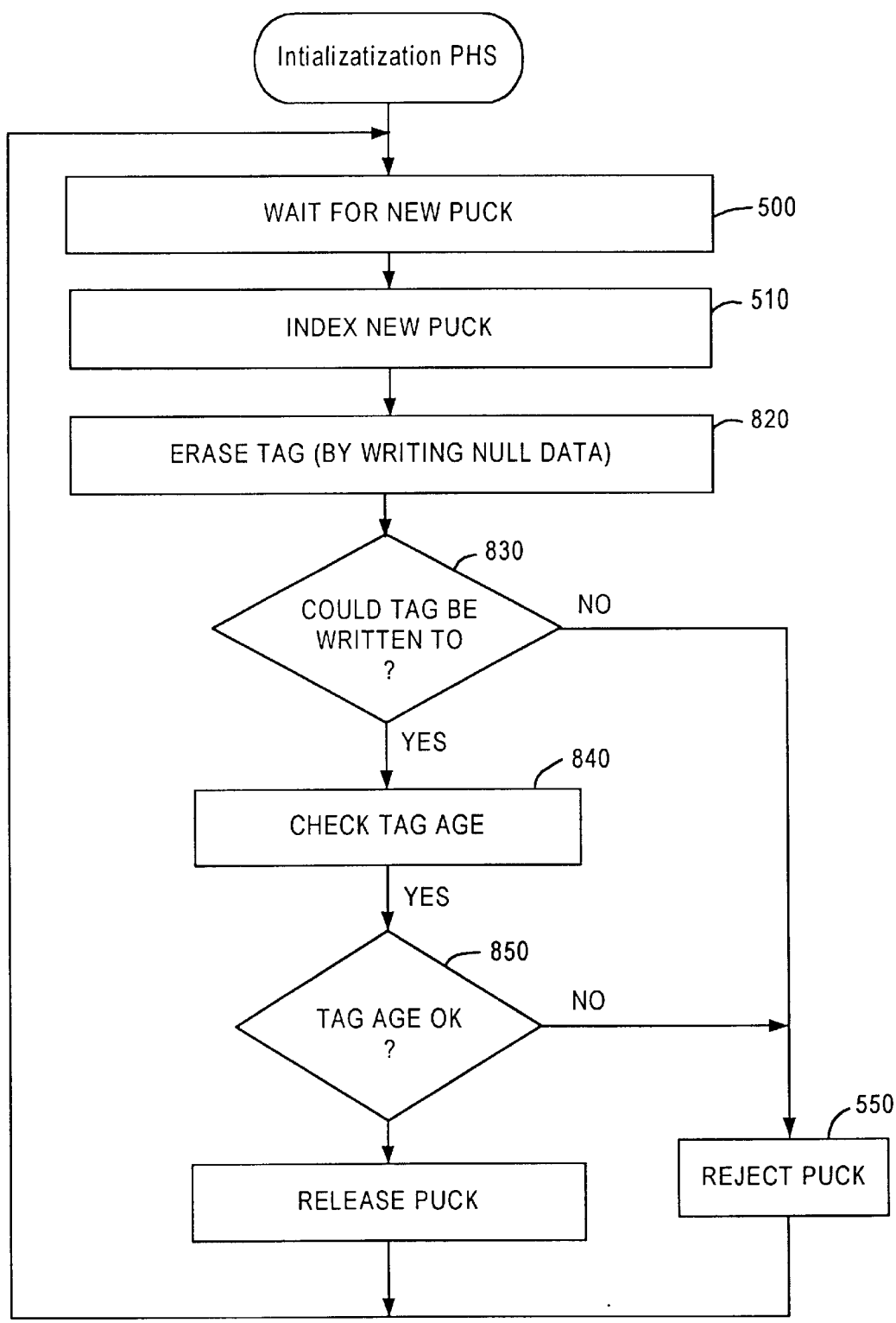
FIG. 8 is a flowchart describing control and operation of initialization PHS 24 of the invention.

Referring now to FIG. 8, shown therein is a flowchart describing control and operation of the puck initialization PHS 24. As shown therein, after initialization the steps 510 and 520 are implemented, as previously described with respect to FIGS. 5–7. However, unlike the standard diverting and non-diverting PHS units or the barcode verifying PHS, the initialization PHS executes a step 820, wherein the tag data are erased, thus initializing the puck to receive further order specific information. Step 820 is implemented by writing null data to the storage device 46 of the puck, although erasure may be implemented in numerous other ways. By performing a writing operation, the invention permits determination of suitability of the puck for further use in the system. That is, order information must subsequently be written to the puck. Thus, a step 830 is implemented, to determine whether the null data was successfully written. If the null data could not be written successfully, the puck (more particularly, the data carrying element 46) cannot be used until corrective steps are taken. Thus, if step 830 determines that data could not be written, the previously described puck rejecting step 550 is executed. On the other hand, if data was successfully written, PHS 24 checks the tag age at step 840, as upon aging the reliability of the puck and its storage may deteriorate. Upon detecting the tag age, step 850 tests the age against predetermined criteria and, if the tag age is unacceptable, the puck is rejected by step 550. If the tag age is found acceptable at step 850, then step 560 is implemented to release the puck.

It should be appreciated that, although different, specific functions are implemented by specific PHS units, the software included with each PHS may be the same. Indeed, in accordance with the invention the PHS software for each of the diverse PHS units is preferably the same. However, as shown in the Tables provided below, DIP switches are provided on the PHS for dynamically configuring the software to implement the specific functions. A setup command is also provided by the controlling PSC (or FSC) in that regard. On receipt of this command, the PHS verifies configuration parameters received from the PSC or FSC with those set on its DIP switches. If a disparity exists, the PHS returns a fault code to the PSC or FSC, and does not start operation. The PSC or FSC is further able to command each PHS to start or stop processing pucks, wherein the power-up state disables puck processing. In addition, the previously mentioned Datalogic CPU board (HS880) is also used in the flex-filler 26 to program the tags while filling. Again, in the implementation described herein, the same software is used.

To make the PHS as generic as possible, and to allow it to be used elsewhere in an expanded line, the puck handling station is configured by a series of eight DIP switches to customize the software to the hardware present, as well as to tell it which bottles it should divert to its alternate outfeed where applicable, as shown above.

The following tables identify specific dip switch settings which may be used to configure a generic PHS to operate in one of three different modes, thus effectively providing three different PHS units—an initializing PHS (Mode A), a non-diverting barcode reading PHS (Mode B) and a diverting barcode reading PHS (Mode C).

STATION FUNCTION TABLE

| Station Function | MODE | A | B | C |
|---|---|---|---|---|
| Non-diverting station | | off | off | off |
| Diverting station | | off | off | on |
| Barcode data reading station | | off | on | off |
| Divert AND Barcode read | | off | on | on |
| Wipe tags | | on | off | off |
| INVALID | | on | off | on |
| INVALID | | on | on | off |
| At filler (used to program order data) | | on | on | on |

SWITCH SETTING TABLE FOR CONFIGURING PHS

| SWITCH | FUNCTION |
|---|---|
| SW 0 | ON to prevent unit from entering monitor program and to cause running of application program |
| SW 1 | ON if the station should send debug info to maintenance serial port |
| SW 2 | Mode C |
| SW 3 | Mode B |
| SW 4 | Mode A |
| SW 5 | Station ID LSB |
| SW 6 | Station ID |
| SW 7 | Station ID MSB |

Fault handling in the PHS is managed as follows. As will become apparent from the subsequent description, on checking a fault the PHS enters a fault state and does not continue to actuate any mechanisms or to rotate the indexing wheel. It then sends a fault message to the FSC/PSC, switches off the running lamp and illuminates the fault lamp.

To clear a fault, the PHS must have had a 'Clear Fault' message from the FSC/PSC, and the user must have pressed the reset button on the front panel. If the PHS receives a 'Clear Fault' message before the user has acknowledged the fault on the front panel, it will flash the fault lamp once per second to indicate that it is ready to run after a reset.

If the PHS is reset from the front panel before it receives the 'Clear Fault' message, it enters the running state immediately after receiving the 'Clear Fault' message. It will not flash the fault lamp. Pressing the "Clear Fault" button extinguishes the "Reset" button.

The reset button has no function when not in fault mode.

On power-up, the PHS generates a NOT INITIALIZED fault, which is required to be cleared by a "Setup" message in addition to the normal fault mechanism.

Figure 9:
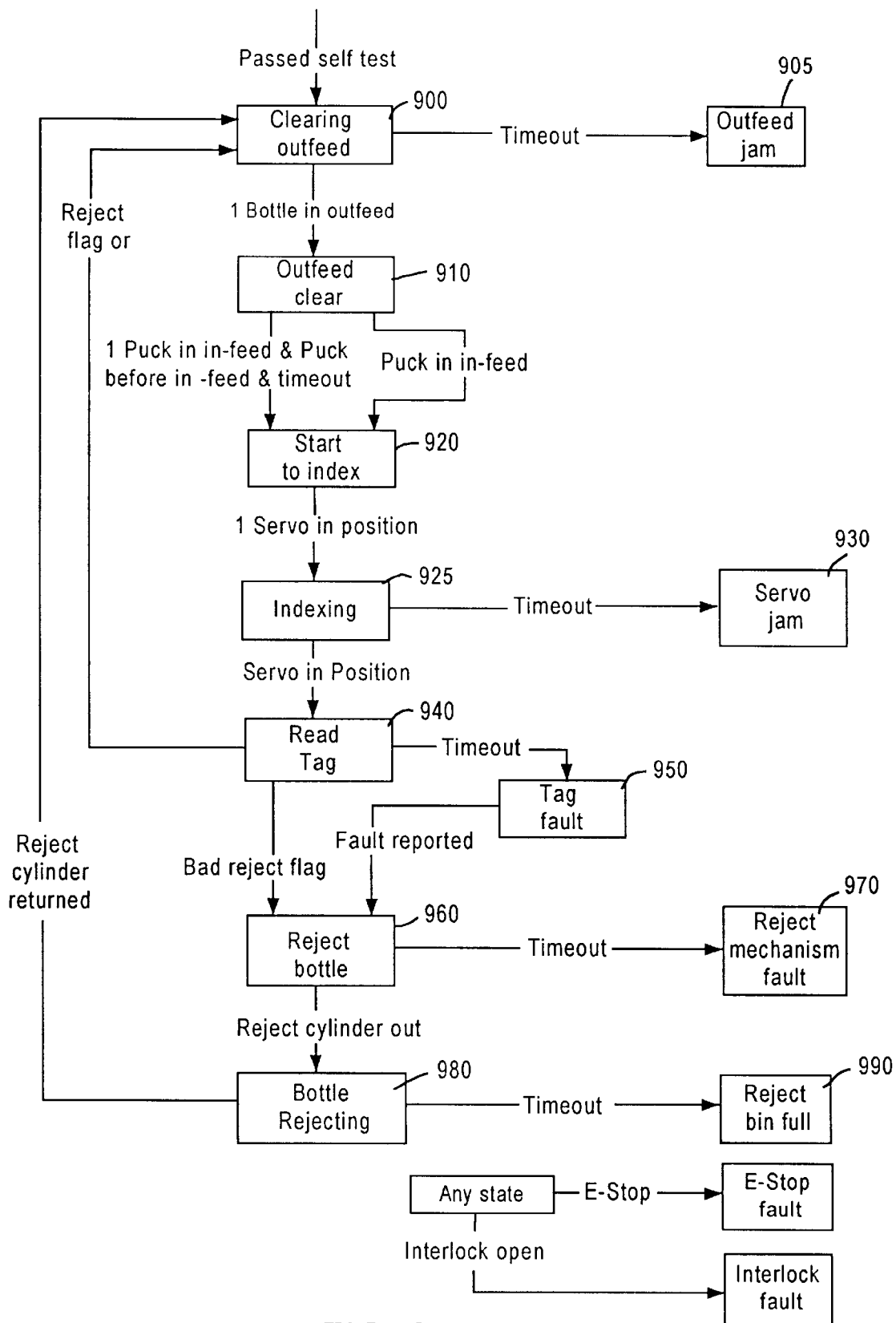
FIG. 9 provides a state transition diagram illustrating control and operation of a generalized PHS according to the invention.

The above, along with the sequences of operations described in the flowcharts of FIGS. 5, 6, 7 and 8 are further described by a channel state transition diagram shown in FIG. 9. The state transition diagram represents operations, states and responses of a controlled device, for example an apparatus (such as the PHS) controlled by a programmed computer, as follows.

It should first be understood that each block in the transition diagram represents a state of the machine described thereby, and that transitions from a particular state to another state are governed by conditions which are detected, or by actions taken (whether by machine components or by operators) when the programmed machine is in the particular state. A state of the machine may be viewed as performance of a particular programmed routine, subroutine or step of a flow chart, or as a call for execution of such a routine or subroutine. Thus, similarly to the representation of such routines or subroutines by steps of a flowchart, the state transition diagram represents the same by a particular state, which is implemented until transition to another state. The transitions are shown by lines connecting the state blocks. In each such line there is provided a textual description of the state transition, including a horizontal line therein. The text above the line identifies the detected condition or action causing the transition. The text below the line, if any, represents an action taken by the programmed machine itself in response to the detected condition, along with the transition to the next state.

In FIG. 9, upon determining that a self test has been passed, the PHS processor (herein: PHS) enters a "Clearing outfeed" state, or routine, 900. In that state, if no transitions occur (i.e., expected inputs are not received) beyond a predetermined time, a 'timeout' signal is generated and, in response thereto, it is established that a jam has occurred in the outfeed. Thus, the PHS enters an "Outfeed jam" state 905, where appropriate corrective action is taken. On the other hand, upon detection in the Clearing outfeed state 900 of a negation of a 'bottle in the outfeed' signal, an "Outfeed clear" state 910, or subroutine, is entered, until it is detected that a negation of a 'puck in the infeed' signal, and a 'puck before the infeed' and a timeout signals are all present. In that case, or if a 'puck in infeed' signal is detected, the PHS transitions from the Outfeed clear state 910 to a "Start to index" state 920, wherein puck indexing is initiated.

That is, step 500 of FIGS. 5–8 has thus been implemented with the PHS waiting for the new puck, and step 510 (or 710) has been initiated. An "Indexing" state 925 then continues so long as a negation of a 'servo in position' signal is received. If a 'timeout' is detected, however, it is concluded that a servo jam has occurred and appropriate corrective action is taken by entering a "Servo jam" state 930. On the other hand, once the 'servo in position' signal is received in the Indexing state 925, the PHS is programmed to transition to a "Read tag" state 940 for reading the puck tag, thereby to implement step 520 of the flowcharts. Upon determining that the 'reject flag' signal is acceptable, i.e., that rejection is not necessary, the PHS transitions to the Clearing outfeed state 900, where the puck is released to implement step 560.

On the other hand, if the tag cannot be read after a given time, i.e., in response to a 'timeout' signal, a "Tag fault" state 950 is entered (corresponding to a negative exit from step 540). From the Tag fault state 950 a fault is reported, resulting in entering a "Reject bottle" state 960, to implement step 550. The same state is entered if the 'reject flag' is bad, corresponding to operation of an initializing PHS at step 830. If the Reject bottle state 960 continues in force until occurrence of a 'timeout' signal, it is determined that the reject mechanism is faulty. A "Reject mechanism fault" state 970 is entered, and appropriate corrective action taken. On the other hand, once a 'reject cylinder out' signal is received, the PHS enters a "Bottle rejecting" state 980, awaiting receipt of a 'reject cylinder return' signal indicative of completion of the reject operation, at which point operation returns to the Clearing outfeed state 900. If a 'timeout' signal is received in the Bottle rejecting state 980, it is determined that the reject bin must be full and a "Reject bin full" state 990 is entered, to implement appropriate correction.

As should be appreciated from FIG. 9, the PHS has an index door interlock and an emergency (manually operable) stop button on the control panel thereof Moreover, an emergency stop can also be generated by the servo motor controller. Thus, as shown in FIG. 9, if an 'interlock open' signal is received at any state, the PHS transitions to an "Interlock fault" state wherein appropriate actions are taken to inform the operator and/or the HLC. Similarly, if an 'e-stop' (emergency stop) signal is received, the PHS transitions to an "E-stop fault" state. In the E-stop state, the index wheel is brought to a controlled stop, the reject cylinder and the diverting gate cylinder are locked in their current position, and the bottle spin mechanism is retracted and spinning is stopped. Further, the e-stop button is illuminated upon activation, and manual resetting is required. After any e-stop, a manual reset at the system control panel is required.

Thus, the state transition diagram of FIG. 9 is seen to convey the same (and additional) information as provided by the flowcharts of FIGS. 5, 6, 7 and 8 previously described.

Flexible Filler

FIG. 10 shows a flowchart governing one portion of operation of a flex-filler, relating to puck handling in accordance with the present invention under control of the FSC 14. As shown therein, the filler unit processor performs a waiting operation at step 1010 until receiving a signal indicating that a puck 12 has arrived, carrying an order bottle to be filled. At this point FSC 14 provides the order information to the flex-filler processor, to write into the data carrying element 46 of the puck at a step 1020 and to control the appropriate channel of the filler to fill the bottle at step 1030. The filler processor, operating with data received from the filler components and identifying the tablet and the number of tablets for example, determines at step 1040 whether the bottle has been filled with the right number of the proper tablet. Upon determining at step 1040 that the bottle is properly filled, at step 1050 the flex-filler marks the tag as acceptable by storing an appropriate flag in its storage element 46. No such flag, or mark, is provided if step 1040 determines an incorrect fill. Alternatively, there may also be provided a positive indication of unacceptability, in the form of a specific flag being stored in storage element 46 of the puck in response to a negative indication at step 1040. In either case, the system thus provides an appropriate reject code for the puck if the bottle is incorrectly filled.

Inasmuch as PHS 28 subsequently implements a reject code detection at step 540 described with respect to FIGS. 5, 6 and 7 to determine whether the puck is to be rejected and, upon detecting such a reject code executes a step 550 to reject the puck, the flex-filler itself does not implement puck rejection. Rather, at step 1060, the puck is ejected, either with an accept flag or without.

Whether or not a flag is stored to indicate unacceptability of the bottle, the requirement for a flag to indicate an acceptable fill provides a fail-safe feature of the invention, in which failure of the system to provide a flag does not result in identifying an unacceptable bottle as acceptable. Such fail-safe operation may also be implemented where an action is required to provide a specific flag for rejection, while permitting acceptance with no flag. Specifically, in addition to wiping all data from pucks, the puck initialization PHS 24 is programmed to mark each puck as a reject, whether 'marking' refers to placing a reject flag or erasing all flags. Thus, at any subsequent station or PHS, if marking for acceptance fails (whether the marking entails providing a flag, as illustrated by a step 1050 at FIG. 10, implemented by the flex-filler processor or entails erasing of a reject marking) the result is a retained reject marking and rejection of the puck. The underlying fail-safe approach is founded on acceptability of a negative error (rejection of a proper bottle) and the unacceptability of a positive error (acceptance of a faulty or improperly filled bottle). Towards that end, it will be appreciated that reliability of PHS 24 is highly significant to the fail-safe operation of the system. Accordingly, PHS 24 is programmed to reject any defective puck—for example, a puck which cannot be erased properly, or which has an exhausted battery—and to inform the FSC accordingly.

As previously noted, detailed description of filler operation is provided in the Archer U.S. Pat. No. 5,522,512 incorporated herein by reference. Thus, the following brief summary suffices to explain operation of the flex-filler, which includes a diverter for each channel of the four-channel flex-filler module. The diverter is controlled by a diverter controller (DC) which logically sits below the FSC to control a single channel. The DC is implemented by a microcontroller, such as the Intel 8xC196KC microcontroller (196), and has a number of inputs and outputs, several interfaces and an interface with the Inspection System Module (ISM). As disclosed in the '512 patent, each DC is responsible for controlling the various elements of a single channel, including a tablet hopper, a vibratory feed system to present tablets to a conveyor, the ISM, a starwheel (with slots for two bottles) for receiving and transferring the pucks from infeed to outfeed while the bottles are being filled, a number of diverter flaps which route each tablet to one of two bottles in the starwheel (or to be rejected or recycled), and a puck writing station (programmer) at the outfeed side of a star-wheel, with as many DC's being provided as there are channels in the flex-filler.

In addition, an FSC has operator controlled infeed and outfeed conveyors, and a filler outfeed puck handling station, which provides the outfeed reject mechanism for the complete filling station and (optionally) the routing of bottles to alternate cappers.

All communication between the FSC and ISMs are routed through the DC's, which have a tightly coupled interface to the ISM to allow it to receive good/bad status and timing information for each tablet. To implement its various control functions, the DC performs a number of tasks, including the following.

The DC accepts administration commands and orders with customized fill levels from the FSC, and queues these orders for filling. The DC further controls and accepts data from the vision ISM. Decisions from ISM have to be monitored in real time. The DC further guides, or sorts, incoming tablets into the different destination routes by actuating appropriate flaps in a two streamed diversion mechanism, thus enabling constant flow of tablets to at least one of two bottles at each hopper. Additionally, the DC manages and maintains the bottle escapement mechanism (i.e., the starwheel) for its channel and controls the vibratory feeder and tablet hopper for the channel. The DC is responsible for continuously monitoring the observed feed-rate and for comparing it to the desired feed-rate, automatically adjusting the vibrational amplitude as necessary if the observed and desired feed-rates do not correspond. Finally, the DC reports back to the FSC when each order has been filled, or has failed.

The DCs are polled every second, and maintain a buffer of incoming or outgoing messages to "take up the slack" in the event that the PC should take longer than usual to return to polling it. The FSC side of serial communications is buffered in hardware so that communication with peripherals will require the minimum of CPU time, and so that no data will be lost.

System Control

Figure 3:
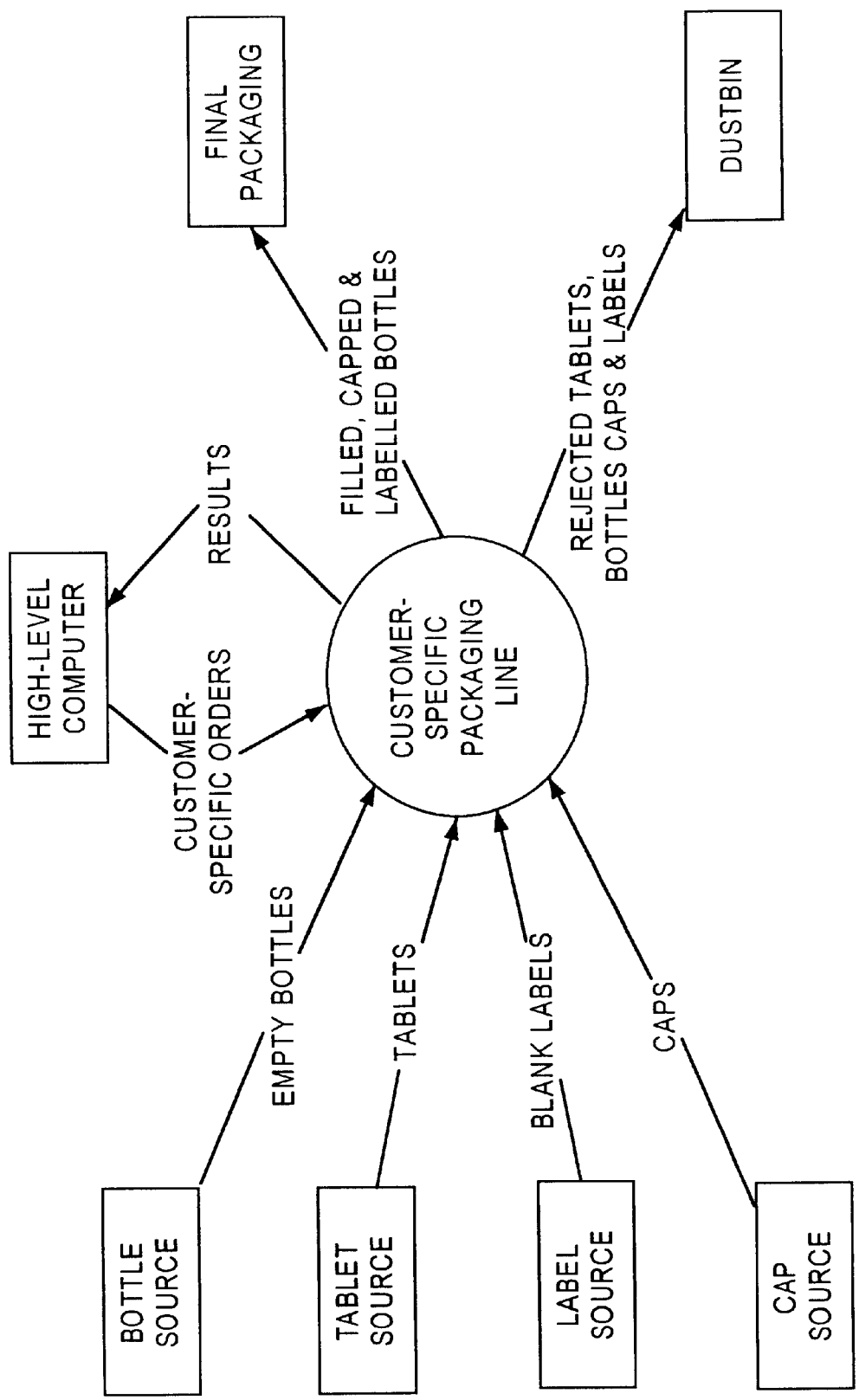
FIG. 3 illustrates flow of materials and data in the inventive system.
Figure 4:
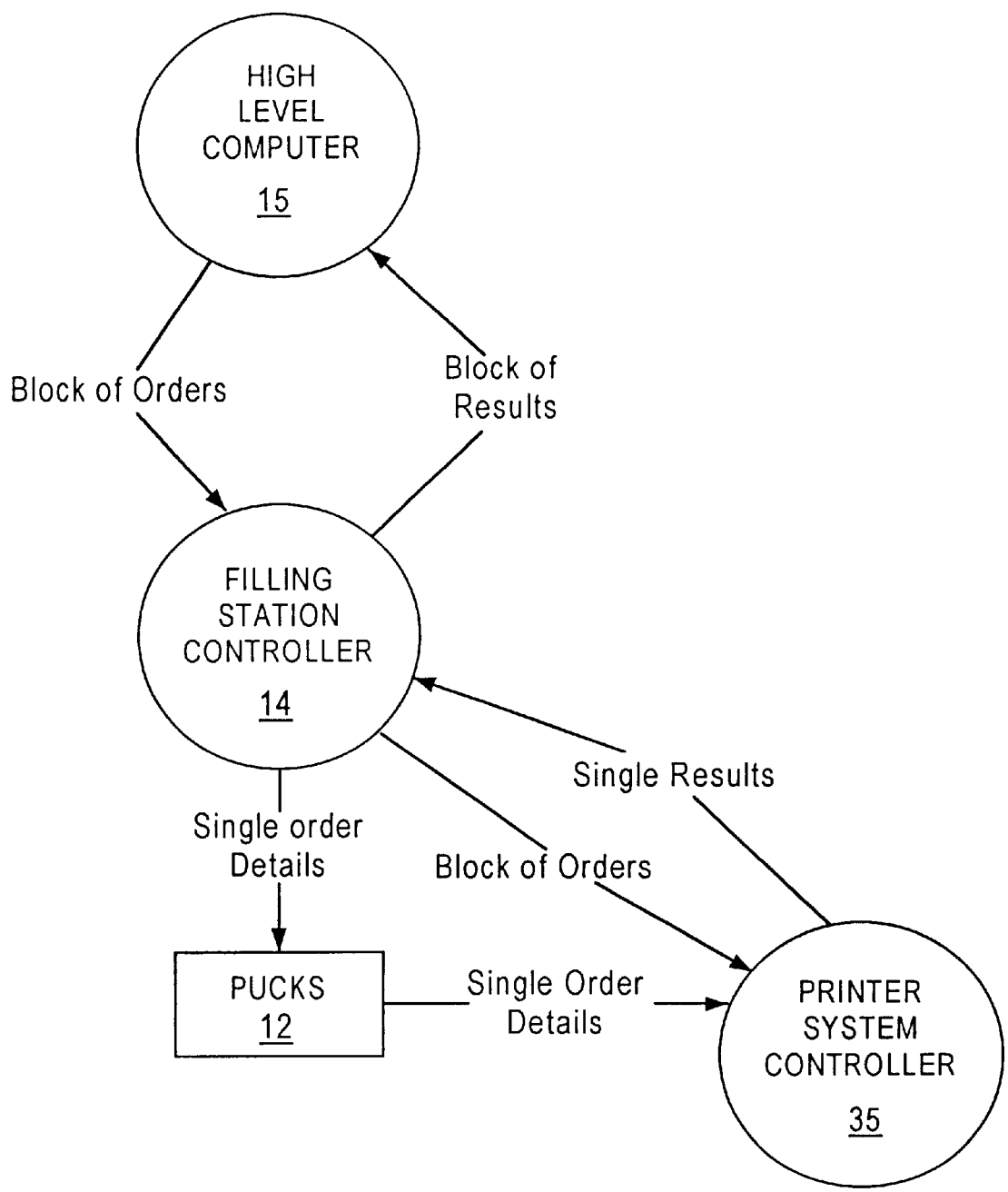
FIG. 4 illustrates major data flows through the inventive system.

From the foregoing, it will be appreciated that the inventive system operates in accordance with a flow of materials and data as illustrated in FIGS. 3 and 4, which broadly describe the manner in which the invention allows customer specific single-bottle drug orders to be filled.

As shown therein, in accordance with the concepts of the invention the system receives inputs of bulk quantities of tablets, empty bottles, caps and blank labels and outputs correctly and individually labelled bottles containing the precise prescription for each "customer"—whether the customer is a consumer ordering a single bottle of several tablets or an intermediate customer, such as a pharmacist or wholesaler, ordering a plurality of bottles, with large numbers of tablets therein. Only one drug type is presently contemplated as being filled into each bottle. However, as above noted, the system can simultaneously be processing several drugs separately and independently of one another.

Presently available technology permits the control system to handle bottle rates of up to 150 bottles per minute although it is clear that, by using improved technology developed in the future, system throughput, performance and efficiency may be improved.

As hereinabove noted, data-carrying pucks 12 track each order through the system. The data carrying elements 46 (tags) of the pucks carry data identifying the specific order in the bottle transported by the specific puck, along with security check data which allows for rejection of unknown, or out-of-sequence, pucks. A number of IBM-compatible PCs of types well known in the art, each of which has several low-level micro controllers attached by serial links, share the various control functions The main computers themselves communicate via a Token Ring network using the TCP/IP protocol. The major data flows through this system are shown in FIG. 4.

As noted therein, HLC 15 provides a block of orders to FSC 14, which forwards the block of data, and specifically the label data associated therewith, to PSC 35 for printing and applying of appropriate labels to the bottles as they subsequently arrive at the printing station. FSC 14 provides data descriptive of each single order to each respective puck 10 after its initialization at station 24. Additionally, FSC 14 controls the filler 26 to fill the bottle carried by a specific puck in accordance with the single order provided thereto, while implementing appropriate tablet verification as hereinabove described.

Upon arrival at the printing station, the details of the single order being carried by the bottle in the puck are read from tag 46 of the puck by the prelabeler PHS 32, and provided to PSC 35. Upon printing and verification (or rejection) of the label and/or order bottle, PSC 35 informs FSC 14, so that the order may be removed from the queue (or rescheduled) as necessary. When results indicating successful filling are available for all orders in a block, FSC 14 informs HLC 15.

Fill Station Controller

The following describes how the complete line, or individual channels, start up running or change to a new drug type. As a clear advantage of the invention, due to the nature of the HLC interface and scheduling system, it is possible for channels to run indefinitely on the same product without frequent "start-ups". In operation, as a safety feature the FSC permits each channel to start up only when there is no old product from that channel in the system. To implement this feature, the pucks carry a "magic number", which allows any old product to be automatically discarded for having the wrong magic number. These numbers are generated by a Scheduling/Control module of the FSC whenever the channel is changed over. Moreover, the control system allows single channels to be changed over while other channels are running.

On channel start-up/change over, the FSC performs the following functions. The FSC prompts the operator to carry out the mechanical changeover and to wait for the operator to confirm the mechanical changeover is complete. The FSC then instructs the DC within the flex filler 26 to reject any bottles currently in the starwheels and to commence the ISM 'teach' mechanism when instructed by the operator. Once taught, the ISM validates the new tablet model with the master model for the current product. The FSC informs the PSC of the new drug type, and magic number, and downloads the first few orders to the DC. The FSC instructs the DC (and PHS units) to run when instructed by the operator.

Occasionally (on instruction from the HLC) the size of bottle or label which the line is using is changed. This can only be done once all product (from all channels) is out of the system. It is noted, however, that it is possible to changeover the bottle size while keeping the same product on each channel. In this case, the mechanical channel changeover is unnecessary, but the re-teaching process will still be performed.

On system start-up/changeover, the FSC is programmed to wait for the operator to confirm the mechanical changeover is complete and to inform the PSC of the new set-up. A regular LINE STATUS message is sent to the HLC to inform it when the operator has confirmed the new line setup and other pertinent information about the state of the line. Each channel then follows its own channel start-up procedure.

Once the system starts up, steady-state operation is straight-forward. As each order is reported as complete by the DCs, they are given a new order to append to the tail of their internal queue. Orders proceed through the system, with the FSC tracking the orders past each major point, until they exit the system. Indeed, since response-critical real-time work is done by lower level controllers, under normal operation, the FSC processor's function is thus simplified. More specifically, the processor acquires new orders from the HLC, schedules orders for filling by the DC's, tracks order progress through the system, reports completed orders to the HLC, monitors system operations, implements an operator interface and acquires status information from the unscrambler, the puck return system, and the capper(s).

The following description clarifies a shutdown of one or more channels of the flex-filler 26. It is first noted that the term "shutdown" as used herein means a controlled end to all processing, and not simply a temporary stoppage. Such a shutdown is of the type that occurs at the end of a shift, or before a product change-over (which may affect just one channel). Shutdown due to a fault is considered later.

Once the last order has been sent, the DC shuts down the tablet feed mechanism once all orders have been filled. Any failures during the end-period are not re-tried, however, to avoid unnecessary complexity in the end-of-run sequence. Such failures are reported to the HLC as Canceled. If no other channels are running, the operator must invoke the PSC's Empty Buffer mode to clear out the last bottles from the labeler. During this period, the FSC tracks orders through the system as usual. Once all orders are finished or failed the FSC reports back to the HLC. The FSC does not exercise any direct control over the capper etc. to turn them off.

Once a channel shut-down sequence has started, the control program in the presently preferred embodiment of the invention requires that the sequence be allowed to run to completion. The channel must go through the start-up described above before recommencing, even with the same drug type.

Figure 11:
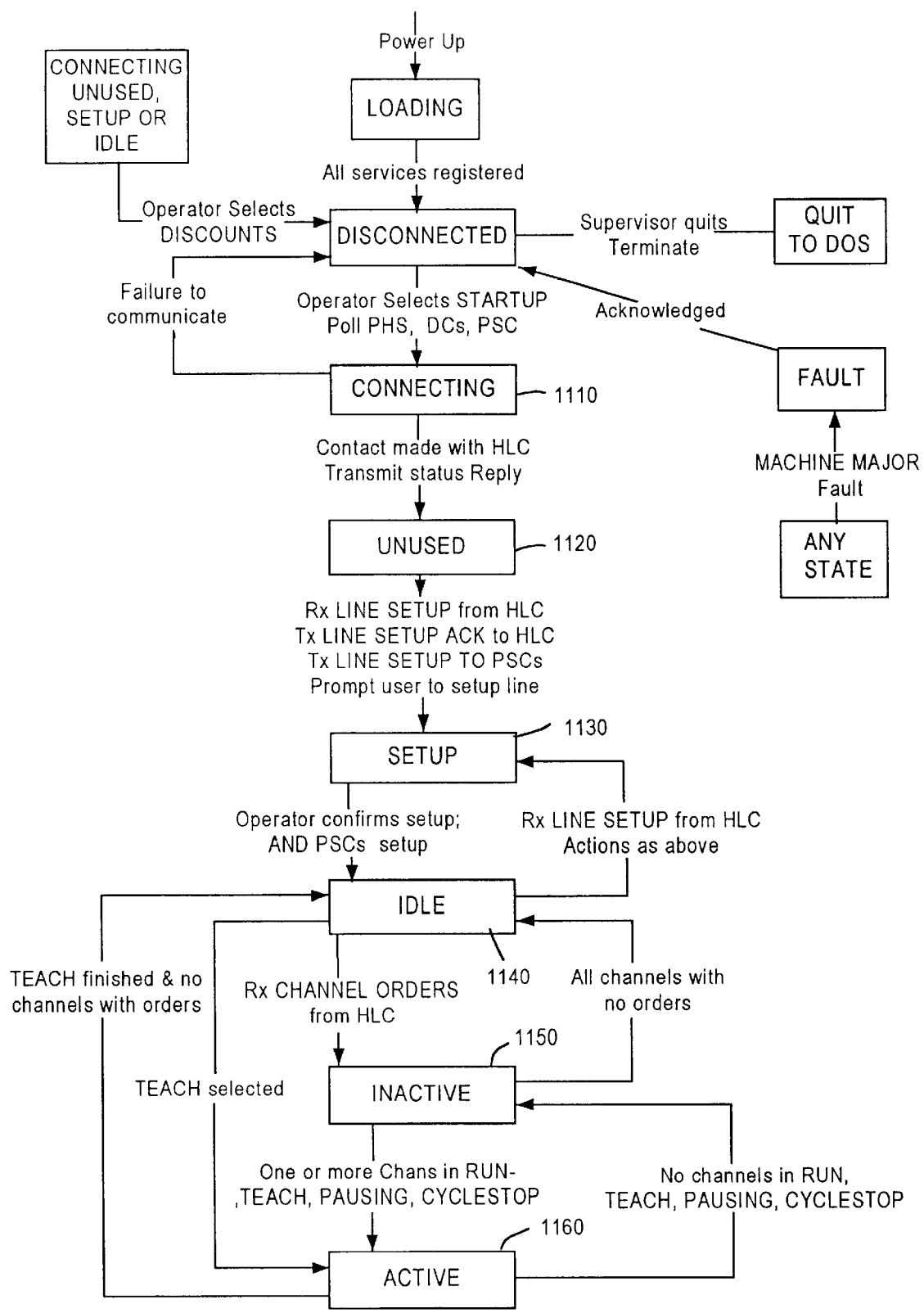
FIG. 11 illustrates operation of the filling station controller 14 in controlling operation of the line as a line state transition diagram.
Figure 12:
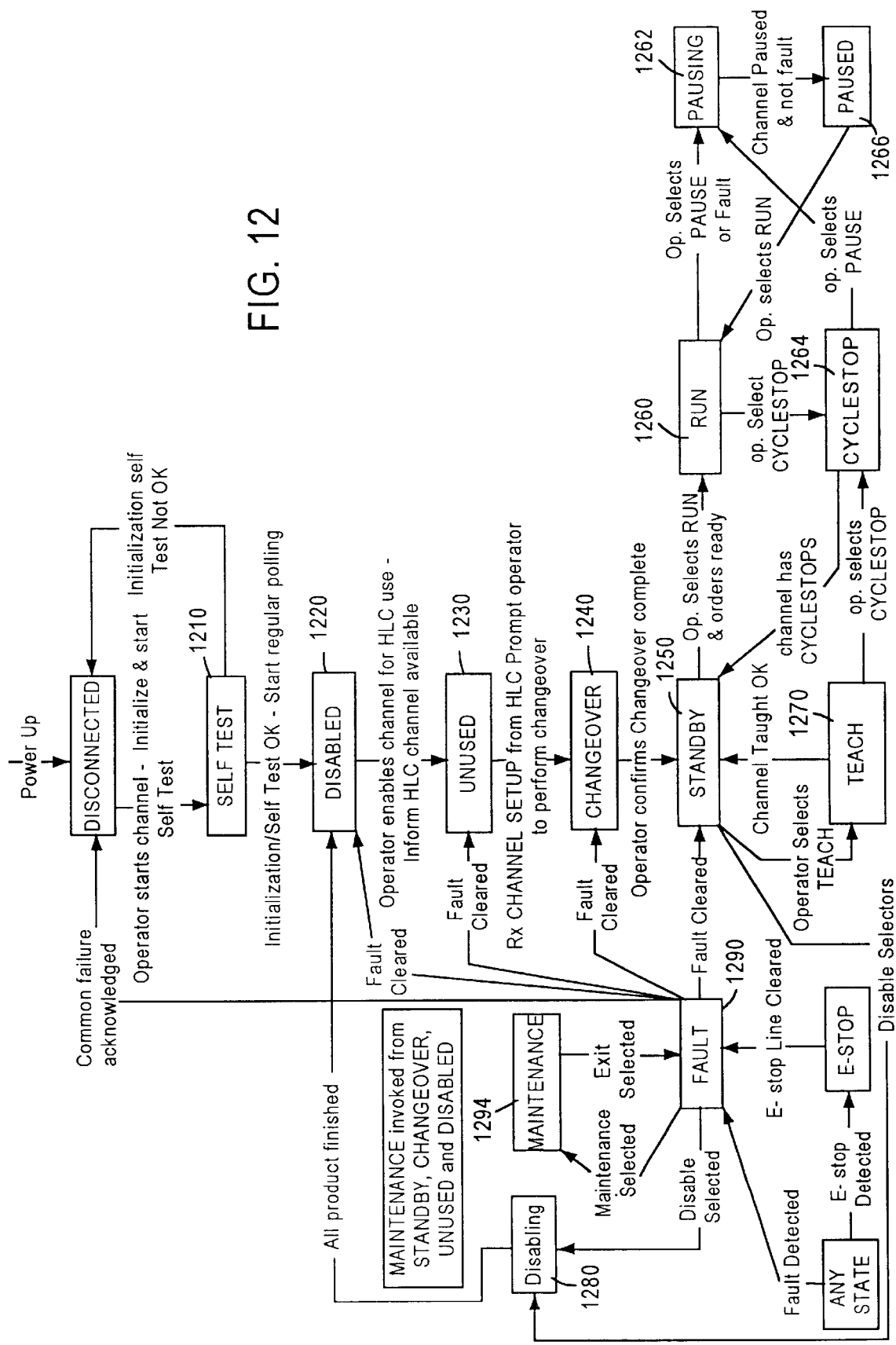
FIG. 12 illustrates operation of the filling station controller 14 in controlling operation of the channels of the filler as a channel state transition diagram.

Various aspects of the above may be better appreciated upon reference to the line state transition diagram shown in FIG. 11 and the channel state transition diagrams provided in FIG. 12, showing the manner in which the FSC processor is programmed to provide control of the entire line and to provide control of a channel changeover, respectively. In order to obtain a fuller understanding of the FSC line control operation, the following table describes the significance of the various states of the FSC in operating under the line state transition diagram of FIG. 11.

| STATE | DESCRIPTION |
| --- | --- |
| LOADING | Software modules are being automatically loaded following power-on |
| DISCONNECTED | Not communicating with HLC or peripherals |
| CONNECTING | Attempting to start communications with HLC and peripherals |
| UNUSED | Comms with HLC and PSC; No Line setup information from |
| HLCSETUP | Setup information received; awaiting confirmation from operator that desired bottle size/label size has been installed |
| IDLE | Line is connected & setup, but no orders are available to be processed |
| ACTIVE | Line is connected, setup, & with orders to process. At least one channel is in RUN, TEACH, PAUSING or CYCLESTOP |
| INACTIVE | Line is connected, setup, & with orders; no channel in RUN/TEACH/PAUSING/CYCLESTOP |
| FAULT | A LINE MAJOR fault has occurred, but has not yet been acknowledged (see following description). |

Addressing a central portion of the state transition diagram, it is apparent from block 1100 of FIG. 11 that, in response to operator selection of a startup control, polling of the PHS units, the DC's, and the PSC is implemented and the Connecting state is entered by the FSC. Upon establishing contact with the HLC, a status reply is transmitted thereto and the Unused state is entered, as shown at 1120. Upon receiving a line setup signal from the HLC, FSC transmits a line setup acknowledgment to the HLC, transmits a line setup signal to the PSC(s), generates a prompt for the operator to setup the line, and enters the Setup state at 1130. Therein, upon receipt of both an operator setup confirmation and a PCS setup signal, the FSC transitions to the Idle state at 1140. If, during the Idle state, a line setup signal is received from the HLC, then the FSC transitions again to Setup at 1130. On the other hand, if channel orders are received from HLC, the FSC transitions to the Inactive state 1150 from which the Active state is entered at 1160 in response to one or more channels being in the RUN, TEACH, PAUSING or CYCLESTOP state, or the Idle state is re-entered if all channels are without orders. The Active state is also entered upon selection of a TEACH operation when in the Idle state. The active state transitions to the Idle state upon finishing of the TEACH operation when no orders are provided to any of the channels, and to the Inactive state if no channels are in the RUN, TEACH, PAUSING or CYCLESTOP states.

In order to obtain a fuller understanding of the FSC channel control operation, the following table describes the significance of the various states of the FSC in operating under the channel state transition diagram of FIG. 12.

| STATE | DESCRIPTION |
|---|---|
| DISCONNECTED | No communications with DC/ISM |
| SELF TEST | DC/ISM is conducting Self Test |
| DISABLED | Not available to HLC for use. (Maintenance may be carried out.) |
| UNUSED | Available to HLC, but set-up information not yet received |
| CHANGEOVER | Setup information received; awaiting confirmation that operator has set up channel |
| STANDBY | Channel is set up. May or may not have orders. Ready to run or Teach. |
| TEACH | ISM is acquiring tablet model |
| RUN | Orders are being processed |
| PAUSING | Operator has selected PAUSE, or fault condition has arisen; waiting for channel to pause |
| PAUSED | Temporary halt to filling. Part-filled bottles may be in star-wheel. |
| CYCLESTOP | Operator has selected CYCLESTOP, or fault; waiting for bottle to be filled/rejected. |
| E-STOP | A hardware e-stop line has been/is asserted but not cleared. |
| FAULT | Channel has a fault |
| MAINTENANCE | Temporary maintenance activity - e.g. clearing escapement jam |
| DISABLING | Operator has selected DISABLE; waiting for last orders to leave system (Cannot abort - must end up in DISABLED state) |

The foregoing description of system startup, channel changeover, and other functions implemented by the FSC may be understood from FIG. 12 as providing a Self test state at 1210 in which DC and ISM are conducting a self test. Upon determining proper operation, the FSC initiates regular polling operations and enters a Disabled state 1220 wherein the FSC is not available to the HLC, and during which maintenance operations may be carried out. In response to enabling of a channel for HLC use by the operator, the FSC informs the HLC that the channel is available and transitions to an Unused state 1230, where the FSC becomes available to HLC, but wherein set-up information not yet received. Once channel setup information has been received from HLC, the FSC prompts the operator to perform a changeover and transitions to Changeover state 1240, from which it then transitions to Standby state 1250 in response to operator confirmation of completion of changeover.

From the Standby state 1250, FSC control transitions to one of three states in accordance with whether the operator selects a run mode (causing a transition to the Run state 1260), a teach mode (causing transition to the Teach state 1270) or a disable mode (causing transition to the Disabling state 1280, from which the FSC transitions to the Disabled state 1220 upon notification that all product has been finished). From either the Run state 1260 or the Teach state 1270, determination of operator selection of cyclestop causes a transition to Cyclestop state 1264. On the other hand, from the Teach state 1270 control transitions back to Standby state 1250 upon determination that the channel has been properly taught. From the Run state 1260, control transitions to a Pausing state 1262 in response to operator selection of pause or to a fault. Upon determining that the channel has paused without a fault, the FSC transitions from Pausing state 1262 to the Paused state 1266 and then, upon operator selection of a run mode, back to the Run state 1260. From the Cyclestop 1264, determination of operator selection of a pause mode sends the FSC to Pausing state 1262, while a determination that the channel has cyclestopped causes a transition to Standby state 1250.

As previously discussed with respect to FIG. 9, detection of an e-stop signal in any state transfers the FSC to an E-stop state until the e-stop line is cleared at which point control transfers to a Fault state 1290. Similarly, detection of a fault in any state transfers operation to the Fault state 1290. Upon acknowledgment of a communications failure, operation transitions from the Fault state 1290 to a Disconnected state while determining that the fault has been cleared returns operation to one of the Disabled, Unused, Changeover or Standby states. However, determination that a maintenance operation has been invoked, from any of these four states, transfers operation to Maintenance state 1294.

Upon consideration of the above described transitions with the previously described functional operation, it will be appreciated that the FSC operating in accordance with the state transition diagram of FIG. 12 implements each of the previously described functions thereof.

Figure 13A:
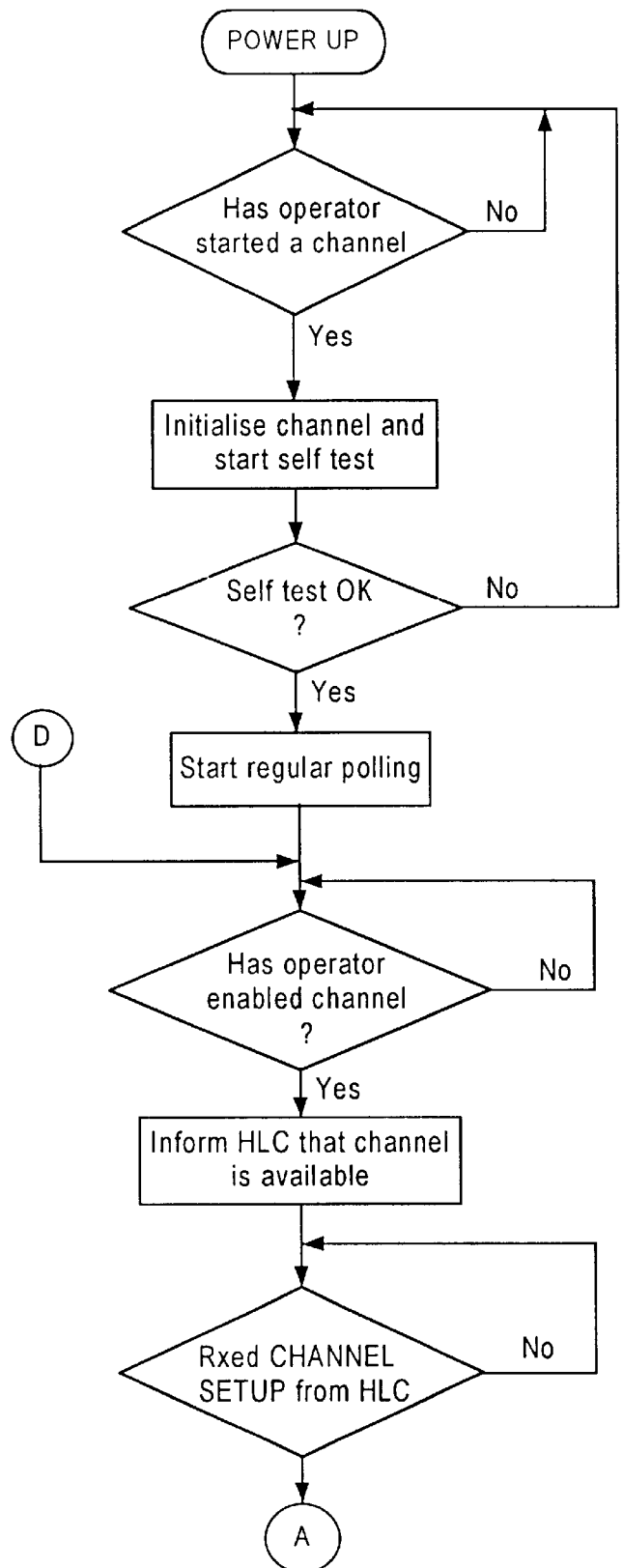
FIGS. 13A, 13B and 13C provide flowcharts describing operation of the filling station controller 14 in accordance with the invention.
Figure 13B:
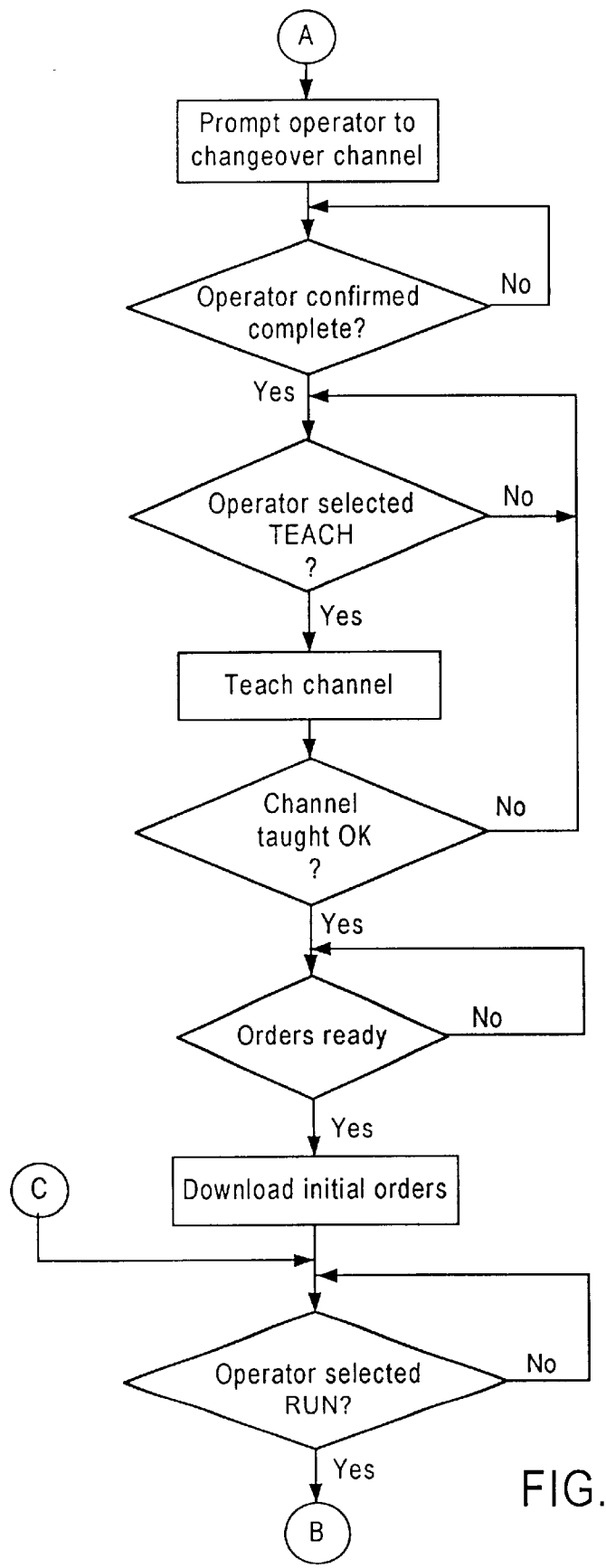
Figure 13C:
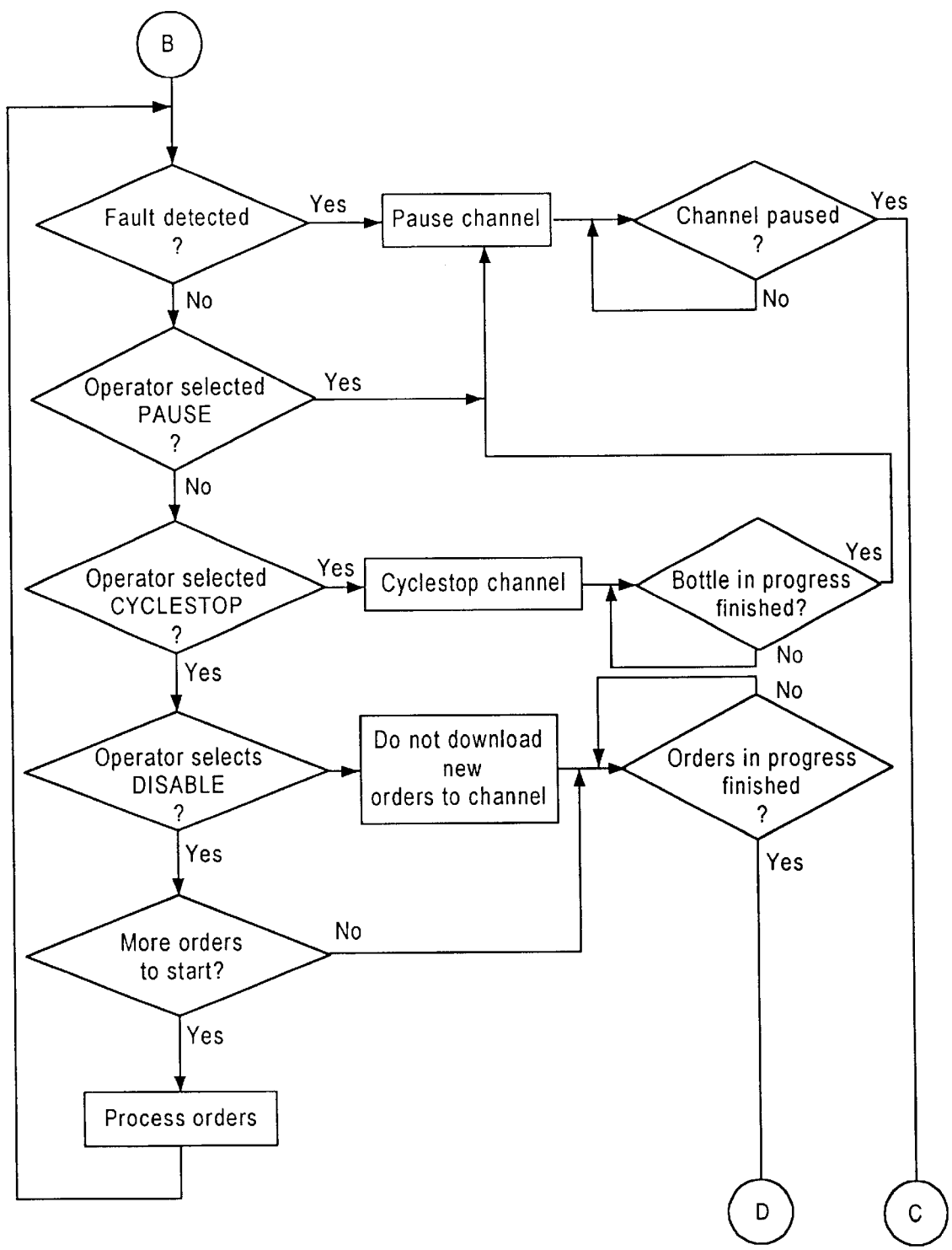

To further explain operation of the fill station controller 14, reference is made to the flowcharts of FIGS. 13A–13C which provide a different presentation of the functions performed by the state transition diagrams of FIGS. 11 and 12. Thus, at FIG. 13A is shown a representation corresponding to that also described by states 1210, 1220 and 1230 and the transitions associated therewith, shown in FIG. 12. Indeed, the limited flow chart of FIG. 13A thus describes FSC control for a single channel, describing communication of the FSC with diverter controllers, the HLC and PSC. The flow chart of FIG. 13B similarly corresponds to states 1240, 1250, 1260 and 1270 (and associated transitions), while the flow chart of FIG. 13C corresponds to the remaining states of FIG. 12.

The various functions performed by the FSC may be more simply implemented by decomposition of the control software into a number of software modules, as described below. The following sections thus give an operational view of the FSC as a whole. Each of the modules is preferably implemented in C (though other languages may be used), with the exception of the FSC User Interface module which is implemented in Visual Basic.

A Network Status/Control module handles the LAN side of the status and control messages to HLC and PSC.

An FSC Order Acquisition module is responsible for receiving database files from the HLC. Received files are passed on to an FSC Order Transfer module.

The FSC Order Transfer module is responsible for copying received order database files to the PSC. Once successfully copied, the FSC Order Transfer module informs an FSC Database Server module that the new file is ready for use.

The FSC Database Server module provides the Scheduling/Control module with sequential access to the Received Orders database. The FSC Database Server module maintains a look-ahead cache to allow the next order to be immediately returned, constructs Finished (or cancelled) Orders database files from orders passed from Scheduling/Control, and periodically passes them on to FSC Order Reporting for sending to the HLC.

An FSC Line Control module implements the Line State Machine, maintains the database of Line and Channel status and production statistics, and provides the Fault and Error handling facilities.

An FSC Scheduling/Control module controls the sending of new single-bottle-orders to the DCs, tracking of single-bottle-orders through the system, and detection and rescheduling of failed single-bottle-orders. This module implements the Channel State Machines for all channels, and maintains the Orders In Progress database, and is responsible for allocating new magic numbers when a channel is taught.

An FSC Order Reporting module transfers Finished or Cancelled order database files to the HLC.

The FSC User interface module implements the front end of the system. This module generates commands to the other modules from user input, and reflects the current state of the system onto the display.

An FSC Serial Drivers module handles all communications with the DCs and PHSs. This module periodically scans the serial ports and reads messages, decodes and validates them, and sends them on to other modules. The FSC Serial Drivers module buffers outgoing communications, implementing the PHS communications protocol, and toggling the PHS watchdog lines.

An FSC Digital I/O module handles all digital I/O. This module periodically scans the digital inputs and reports changes to the Line Control module. The FSC Digital I/O module provides facilities for other modules to write digital outputs, and records the current settings.

An FSC capable of operating as above described to execute the foregoing functions may be implemented using a hardware configuration including the following components:

- IBM Compatible PC rack mounted 486 DX2 66 Mhz PC with 16 Mbyte RAM
- High-performance 1024*768 graphics accelerator
- 17" touch screen
- 500 Mbyte hard disc
- Advantech PC-LabCard 8-port Intelligent RS232 Interface Card with RS422 adapter
- Blue Chip Digital I/O card
- IBM 16/4 Token Ring Adapter II, set for 16 Mbit operation and
- Handheld terminal with attached deadman's switch.

Line Control

In the aforementioned system, a High Level Computer that interfaces directly with a "real" order database is not provided. Instead, a simulation is used, which implements the same communication to the FSC as the full HLC, but having a smaller database. This "cut down" version of the HLC is described below.

Supervision of the FSC is generally implemented by the HLC 15, which is configured and programmed to perform the following functions.

1) Allow off-line editing and creating of orders in a standard database format;
2) Allow manually-instigated set up of each individual channel on a single FSC;
3) Allow manual allocation of orders to individual channels;
4) Automatically schedule blocks of orders to specified channels when appropriate; and
5) Maintain a record of the orders fulfilled or canceled by the Line.

New orders can be added to the central database when the HLC is off-line. The HLC thus allows large numbers of orders to be created and added to the database. Once the system starts up, FSC 14 tracks orders as they proceed past each major point through the system, until they exit the system. At each stage, the FSC determines if any orders are missing. The FSC automatically reschedules missing orders.

It is anticipated that in future embodiments of the system the HLC will be implemented by software running on a main frame computer, communicating with a central database of orders to be satisfied by the CSPL.

Channel Shutdown

The shut-down process for each channel is as follows.

Once the last order has been sent, the DC is told that there are no more orders to process. DC shuts down the tablet feed mechanism once all orders have been filled. The PSC 35 is informed that the channel is stopping, and is passed the last filled order number. In order to avoid unnecessary complexity in the end-of-run sequence any failures during the end-period, subsequent to filling, are not allowed to be re-tried. Such failures are reported to the HLC 15 as Canceled. FSC 14 tracks orders through the system as normal, and reports back to the HLC once all orders are finished or failed. Once a channel shut-down sequence has started, the presently preferred embodiment of the invention requires the sequence to run to completion. The channel must then go through the above described start-up before recommencing, even with the same drug type.

The invention provides for the following sequence of operations on channel shutdown. Specifically, the PSC is programmed to wait for the specified-last-order to be seen and to leave or be rejected, with timeout (reset after each order from the channel is seen). Further, the PSC informs the FSC of the completed/rejected orders as normal and instructs PHS units that the specified channel has shut down.

If all channels are either being shut-down or are already nonoperational, the PSC is programmed to:

1) Wait for the last specified-last-order from all channels to be seen by the Labeler Input PHS, with timeout;
2) Commence printing blank labels;
3) Wait for the last order to be seen by the Verification PHS;
4) Stop printing blank labels; and
5) Inform the FSC of completed/rejected orders as normal.

Process Integrity

As will be appreciated, when different bottles are being filled with different prescriptions, it is vital to assure process integrity. Such integrity is still more significant when the process is applied to filling medication prescriptions, when errors may have devastating consequence to a consumer. In addition to the steps taken in the above described procedures to eliminate errors, the invention provides specific, and different, error recovery procedures which are followed dependent upon the nature of the fault. The main error classifications and their error recovery procedures are described below.

a) Filler Channel Error

Faults identified as filler channel errors are faults which require a single channel to be shut down soon, but not immediately. Thus the bottles currently in progress are allowed to be filled and ejected, leaving only empty bottles in the starwheel of the flex filler. The affected channel is precluded from further use until the fault is cleared, for example by emptying the tablet recycle bin. During this time, maintenance can be carried out on this channel, but the rest of the system continues operating normally. Once cleared, the operator re-enables the channel and selects a RUN sequence once more.

b) Filler Channel Exception

Faults identified as filler channel exceptions are faults which are similar to, but more serious than, filler channel errors. They require an immediate halt to bottle filling on the affected channel. Such an immediate halt has the potential of leaving part-filled bottles in the starwheel (still tagged as Rejects). DCs recycle all tablets until the tablet feed system has stopped. The fault can then be cleared. When the channel is re-started, the part-filled bottles are rejected.

c) Printer Error

Printer errors require a printer to be shut down, probably for a short period of time. Some labels may be wasted, but no bottles need be rejected. Upon detection of a printer error, the FSC and the PSC display a fault message. The operator must then clear the fault (e.g. by replacing the ribbon). The recovery procedure is interactive and the PSC operates in accordance with the following sequence:

Prompt operator to rectify the fault;

Wait for operator confirmation;

Print labels in jog mode, during which the operator is required to remove blank labels from the web until the first printed label is ready to be applied to the correct bottle; and Start labeling again as normal.

d) Printer Exception

These faults are very serious, and require all product in the printer station to be discarded as the integrity of product and label matching is suspect.

e) Line Major Fault

Line major faults are very severe. All product in the system is suspect, and is thus discarded. The system may be rendered nonoperational. A manual system of identifying which orders have been successfully completed must be used in those circumstances.

Handling of Line Major Faults

FSC/PSC are programmed to stop processing orders immediately and to instruct the various PHS units in the system to stop. All finished orders are reported to the HLC.

The recovery procedure then includes manual removal of all filled bottles from the system and manual identification of the last finished orders to the HLC, in case some orders were finished which are not reported. Thereafter, the FSC is restarted. Upon restarting, the FSC is programmed to:

report any un-reported finished orders to HLC;

clear out its Orders Received database, and allocate new channel session numbers.

The HLC is enabled to re-schedule orders which were not completed.

It is a feature of the invention that any bottle which is determined to have been defectively filled, capped, or labeled, or otherwise erroneously handled, is rejected prior to the next packaging line operation.

Having described the various components of the inventive Line, as well as various of the individual modes of operation of these components, the following broadly identifies further details of operation of the system.

High Level Computer

Throughout the description of the present invention, reference has been made to the high level computer (HLC) 15 and to various interactions among the components of the CSPL and the HLC. The following description provides details of the HLC and of its interaction with these components, and most specifically of its interaction with FSC 14. Prior to that description, it is noted that the HLC as presently contemplated runs under Microsoft Windows and is implemented using a combination of C and Visual Basic. However, it should be well appreciated that any other operating system and software implementation may be used.

The role of the HLC in the system is to allow off-line editing and creating of orders in a standard database format, to allow manually-instigated setup of each channel on the FSC, to allow manual allocation of orders to individual channels, to automatically schedule blocks of orders to the specified channel when appropriate, to control the line in accordance with any network communications protocol which may be used, and, in potentially its most important role, to maintain a record of the orders fulfilled or canceled by the line.

Upon a system start-up or changeover the HLC attempts to establish communications with the FSC once enabled by the operator, thus first allowing off-line creation of orders. Once communicating, the HLC permits the operator to select a new line setup (e.g., a new bottle size) when all channels are idle and to establish a new channel setup when the specific channel is idle.

In a demonstration pilot project the HLC was configured to test and demonstrate the capabilities of the line, and thus implemented a Central Database of test orders. This database contains fill details for orders of any drug type, and these orders can be re-used as required. However, during normal operation, the operating database will, of course, include the fill details for any order, of any drug type.

New orders can be added to the Central Database when the HLC is off-line. The pilot HLC thus allowed a large numbers of orders to be created and added to this database using simple test data. In use, the operator selects a Drug Type and Variable Field Template, and then specifies the individual details for each single-bottle-order. For system security and integrity, this database may be backed up to (or loaded from) an optical disc.

When operating in the steady state, the operator allocates orders from the Central Database to be run on individual channels. The HLC splits these orders up into specific size and format, and transmits them to the FSC so as to keep each channel busy until there are no more orders. Thus, it is a function of the HLC to manage the format of the orders. Moreover, the HLC receives completed or rejected order details back from the FSC, and reconciles these with its own record of what was required.

The HLC is programmed to permit an operator to request that a channel be shut down at any time, using either of the following methods:

a) Stop sending new orders for that channel, such that the FSC will process all orders it has received before it stops, and b) Instruct the FSC not to start any more single-bottle-orders, even if it has received some which have not yet been started. The FSC channel enters its DISABLING state, allowing all filled bottles to leave the system normally. Once this second option has been selected, it may not be revoked. The channel eventually stops, and must then be Enabled and Setup again before further use.

The FSC user interface, rather than the HLC, is used to abort single-bottle-orders which have been filled but are still in the system.

Figure 14:
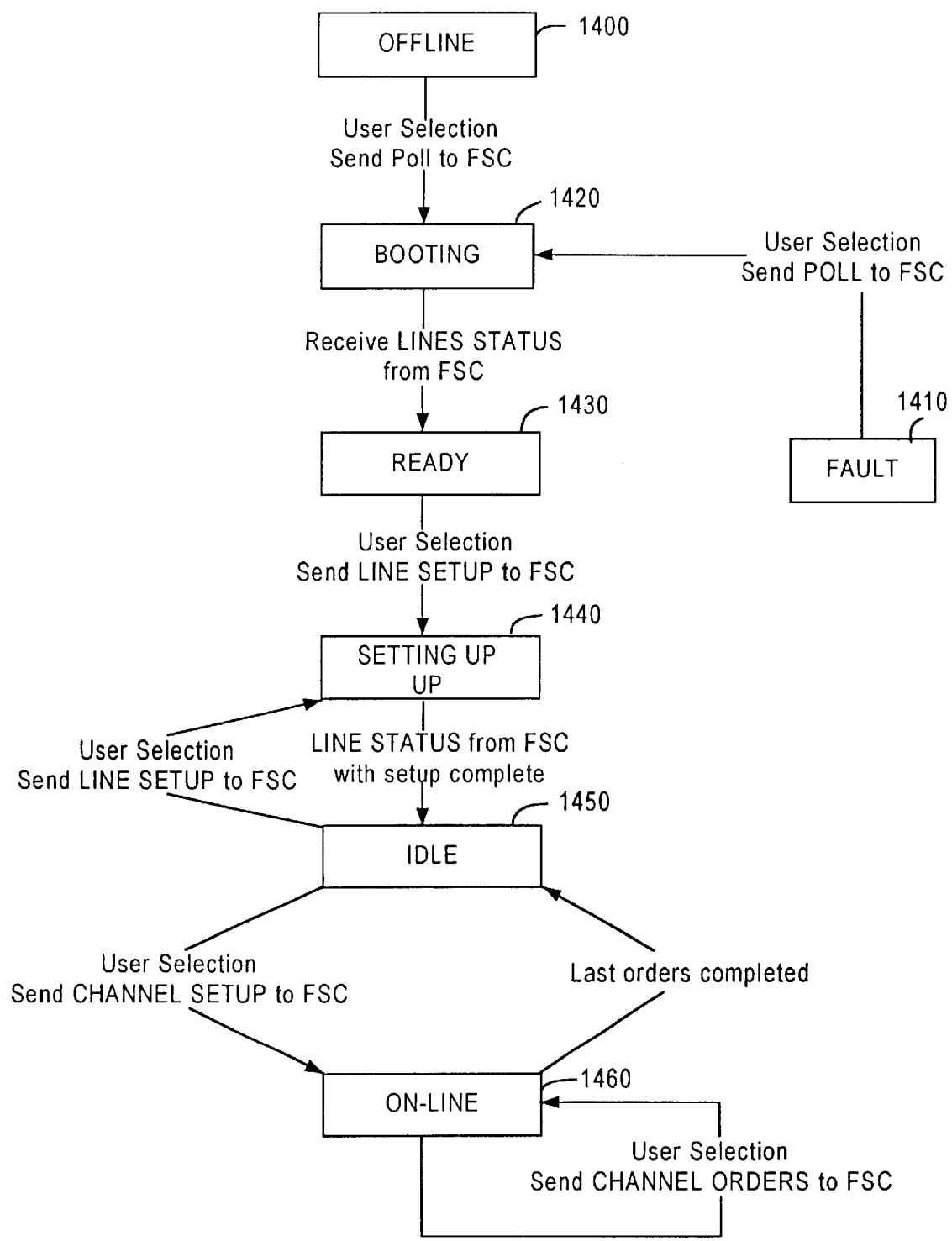
FIG. 14 is a state transition diagram illustrating operation of HLC 15.

Similarly to the previous description of the states of the FSC and PHS, the following description provides the details of implementation of the HLC with the aid of the state transition diagram of FIG. 14. As with the previous descriptions, the following state table is provided to describe the significance of the various states of the HLC in operating under the state transition diagram of FIG. 14

| STATE | DESCRIPTION |
|---|---|
| OFFLINE | No attempt to communicate with FSC. |
| BOOTING | Attempting to communicate with FSC. |
| READY | Comms with FSC; No Line setup information sent |
| SETTNG UP | Setup information sent; awaiting confirmation from FSC that desired bottle size/label size has been installed |
| IDLE | Line is connected & setup, but no channel have orders to process |
| ON-LINE | Line is connected, setup, & with orders to process. |
| FAULT | HLC fault has been detected (e.g. communications failure) |

As illustrated in FIG. 14, when the HLC is offline or after a fault detection (i.e., the HLC is either in its Offline state 1400 or in the Fault state 1410), upon receipt of a user selection signal the HLC polls the FSC and enters the Booting state 1420 in an attempt to communicate with the FSC. In response to receipt of Line Status data signals from the FSC, the HLC communicates with the FSC (though not vet sending line setup information thereto) and enters the Ready state 1430. However, once in the Ready state, upon receiving a user selection input signal, the HLC sends a Line Setup command to the FSC and, in Setting Up state 1440, awaits confirmation that appropriately sized bottles and labels have been installed.

When the FSC provides a Line Status signal with an indication that setup has been completed, the HLC enters its Idle state 1450 and awaits further user inputs, for line or channel changes and setup. When a new line setup is requested by the user, the HLC transitions to the Setting Up state 1440. When a channel setup is requested, the HLC transitions to its Online state 1460, wherein Channel Order signals are sent to the FSC in response to user selection inputs and wherein, upon receipt of a signal from the FSC indicative of completion of the last order, the HLC transitions to the Idle state 1450.

The user interface of the HLC preferably provides for off-line editing and creating of orders in a standard database format, and backup/restore to removable media. Further, the interface permits: setup of each channel on a single FSC; allocation of orders to individual channels; display of the number of orders Waiting, In Progress, and Done for each channel, and interrogation of system status (individual channel status, whole line status). Preferably, password protection is provided by the interface.

To implement the above, an Off-line Database Creation software module is provided. This module may be implemented in Visual Basic. The following description of the functions implemented by this module will enable its implementation in a straightforward manner.

The Database module is intended to allow creation and editing of the various configuration database items off-line. Further, the module will allow new drug types to be added to the drug database table (Microsoft Access version 1.0 format or the like), and existing items to be edited. Moreover, the module should create and edit Variable Templates under user control. The templates may be stored in tables in the Access format databases and used to create new orders and to specify channel setups. Still further, the database module creates of new orders, which are added to the Central Orders tables in the database (Access format). Orders may be created en masse using simple test data; or individually. Any order in the Central Order Database may be edited. Still further, the Database module implements transfer of the Central Order Database, Variable Template Database, and Drug Details Database to and from a magneto-optical storage device.

More relevant to implementation of the concept of the invention, however, is the manner in which the HLC operates for order handling and scheduling.

With respect to order handling, the HLC permits an operator to allocate orders from the Central Database to individual channels during system operation. The HLC limits the selection to orders which match the current Line and Channel setups. It then splits the orders into separate files suitable for transmission to the FSC, and places these files in a directory specific to the chosen channel, marked as Waiting. The Central Database is updated to prevent those orders from being re-used, but the order details are preserved for use in the future.

With respect to order scheduling, once allocated to a channel, the HLC automatically schedules a channel to the FSC when appropriate. The whole database file is marked as In Progress once sent to the FSC. A simple scheduling algorithm is used which tops up the orders for a channel when they fall bellow a customizable level.

As appreciated from the foregoing description, and as illustrated in the transition from state 1460 to state 1450, the FSC reports back the orders that it has completed or canceled in database files. Each single-bottle order in the file is reconciled with the corresponding entry in the Central Order Database, an error flag is raised if there are any discrepancies, and the entry marked as Completed or Canceled according to the returned data. The files, which include Time Filled, Lot and Expiration Date fields, are archived in a separate directory from which they may later be read off line, if required. Using the Off-Line interface, the operator can re-enable orders in the Central Database so that they may be used again.

The above described functions of the HLC may be implemented by various additional software modules, which may be separately provided, as follows.

An On-Line Control module may be implemented in Visual Basic to implement On-Line front end, setup/configuration and scheduling functions, by controlling setup of the Line and each channel, and monitoring the state of the line. Such a module will also allow orders which match the current Line and Channel setup to be extracted from the Central Order Database and added to the Waiting/In Progress Order Databases (which are stored as flat-format database files). Further, the module controls the transmitting of database files logged in the Waiting/In Progress Order Databases to the FSC and is responsible for reconciling finished and canceled orders returned from the FSC with the Central Order Database, A Network Status/Control module may be implemented in C, to control the network communications with the FSC to perform Line and Channel setup, to implement regular polling of the FSC and to report the Channel/Line status to the On-Line Control module. Polling is enabled and disabled by the On-Line control module.

An HLC Order Transfer module may also be implemented in C, to control the network communications with the FSC to transfer new order databases to the FSC, when prompted to do so by the On-Line Control module.

An HLC Order Completion module may also be implemented in C, for controlling network communications with the FSC to transfer finished or canceled order databases back to the HLC, and for informing the On-Line Control module when each database is received.

Other software may be used to provide the following three basic facilities for software development. A library of common operations, such as logging data to files and reading configuration information; a communication mechanism to allow direct function calls and message passing between separately compiled and executed modules, and a common debugging and transaction monitoring layer.

It is recognized that the inventive concepts may be implemented using the above approach, or by using any other software approach to implementation thereof Accordingly, and in view of the straightforward manner of such implementation, a detailed description is omitted.

An HLC capable of operating as above described to execute the foregoing functions may be implemented using a hardware configuration including the following components:

IBM compatible desk-top 486 DX2 66 Mhz PC with 16 Mbyte RAM

14" standard 1024*768 SVGA screen

500 Mbyte hard disc

SCSI 128 Mbyte Magneto-Optical disc drive, and a

IBM 16/4 Token Ring Adapter II, set for 16 Mbit operation.

Print Station Controller

As is clear from the foregoing description, Print Station Controller (PSC) 35 permits implementation of the concept of the invention by being at the heart of the label printing station and by communicating with the various components thereof. Towards that end, the PSC performs the functions of:

1) Acquiring order data from pucks via the Labeler Input PHS as bottles enter the printer subsystem;

2) Feeding the printer and OCV system with data for each label;

3) Verifying the match of label to bottle via the Verification PHS;

4) Tracking the progress of orders through the printing system; and providing

5) High level control of the labeler.

The operator is entrusted with ensuring that the first printed label is applied to the first bottle. This is done via standard controls provided on the labeler itself Upon receiving a system set up command from the FSC, the PSC requires the operator to load the correct label stock and ribbons, and adjust the labeler and informs the FSC once the set up is indicated by the operator to be complete.

Once channel(s) have been set up and the first bottle arrives, the PSC is programmed to start the OCV as required and to print labels and track orders, as normal.

The PSC continues to read details from each order as it enters the system. Print details are added to the tail of the print queue, and are primed in sequence in due course.

The above described sequences assure that the rigid sequence of bottles and labels is maintained throughout the line, including particularly after printing of the labels and prior to and subsequently to affixing the labels to the bottles. Any error is checked by the verification stage, so that only verified orders leave the print system.

If no new bottles enter the sub-system, then printing will stop once all the current labels have been printed. Due to the gap between the printer 34 and the label application point of the labeler 38, several printed labels are always waiting on the print web, and several bottles waiting to be labeled. When a new bottle is seen, its label is printed (via the normal queuing mechanisms). This allows the label at the front of the web to be applied to its bottle.

The heart of the printer control system is provided by an industrial PC, which holds a secondary database and has a secondary user-interface. The following provides a description of the requirements, features and design of the PSC.

The PSC is specifically connected to, and controls, a number of devices forming the label printing station. These devices include Labeler Infeed Puck Handling Station 32, which establishes the identity and sequence of orders entering the system. A strictly managed conveyor takes pucks from PHS 32 to the label application point. Primary Label Printer 34 (e.g., the TEC B572) operates in response to the PSC. Also part of the system are the Optical Character Verification and Print Quality Inspection system (PQI/OCV 36) which verifies that critical information on each label can be read and is valid. Labeler 38 applies the labels to bottles, and Verification Puck Handling Station 40, which includes a bar-code reader, is used to validate a match of label and bottle, and to establish the identity and sequence of orders exiting the printing system.

Steady-state running of the system is reasonably straightforward. Complexity arises due to faults, and also at the start and end of operations. With all the response-critical real-time work being done by lower level controllers (of the PHS 35 and verification PHS 40 for example), the PSC's role is primarily to implement the functions of acquiring order data from pucks via the Labeler Input PHS 35 as bottles enter the printer subsystem; feeding the printer and OCV system with data for each label; verifying the match of label to bottle via the Verification PHS; tracking the progress of orders through the printing system and controlling the labeler. As previously noted herein, the PHS units send unsolicited messages when required. The PSC side of the communications is buffered in hardware so that communication with peripherals will require the minimum of CPU time, and so that no data will be lost.

Figure 15:
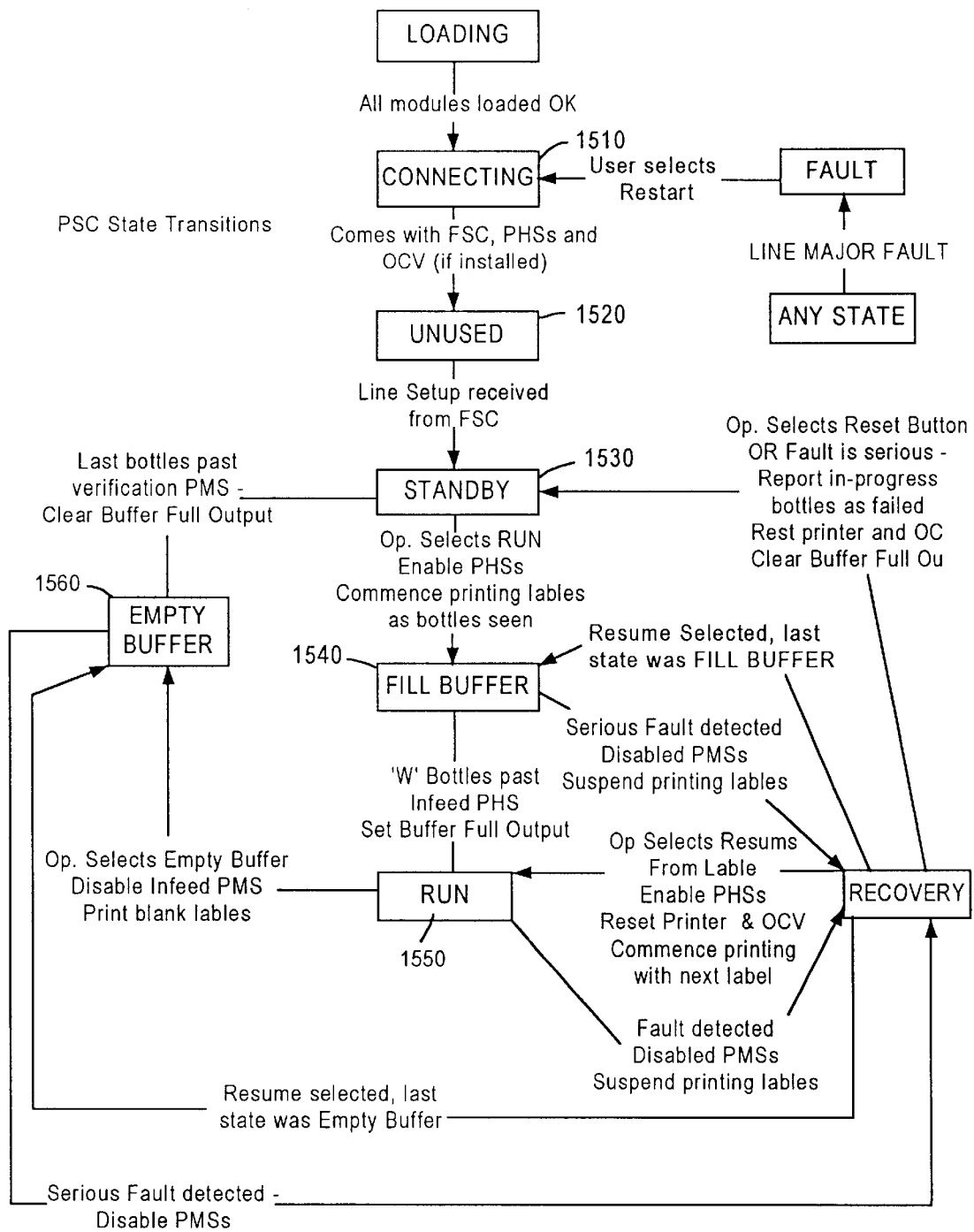
FIG. 15 is a state transition diagram illustrating operation of PSC 35.

Software operation of the PSC is illustrated by the state transition diagram shown at FIG. 15. As with the previous descriptions, the following state table is provided to describe the significance of the various states of the PSC in operating under the state transition diagram of FIG. 15.

| STATE | DESCRIPTION |
| --- | --- |
| CONNECTING | No communications with FSC |
| UNUSED | Communication with FSC, but no setup information received |
| STANDBY | Line Setup received. Ready to run. |
| FILL BUFFER | Filling pre-labeler buffer with bottles |
| RUN | Orders processed as they arrive. |
| EMPTY BUFFER | Flushing the bottle queue by printing blank labels |
| RECOVERY | Fault detected; waiting for operator to acknowledge, or to select recovery strategy. |
| FAULT | Line Major Fault detected; waiting to be re-connected to FSC |

As is apparent from FIG. 15, when powered up, the PSC enters a Connecting state 1510 where it waits until the FSC starts communicating. Once the first PSC POLL arrives, the PSC transitions to an Unused state 1520. When the first Line Setup message arrives, the state changes to Standby state 1530.

Before any bottles arrive, the FSC must have set up at least one channel. Thus, when the PSC receives a Channel Setup message (from the FSC), it loads the label template (defining the format of the printed label for that channel) to the printer, informs the OCV of the new template, and sends a new magic number to the PHSs for validation. Although not shown in FIG. 15, these steps are performed in the Standby state.

From the Standby state 1530, the PSC enters the Fill Buffer state 1540 when enabled by a Run input provided by the operator. After receipt of the Run input, as bottles arrive at the infeed, the label is printed and the OCV 36 is informed. Once a preset number ("N") of bottles have been seen, the state changes to the Run state 1550 and the Labeler 38 is enabled by a Buffer Full output signal. In the steady state, the PSC continues to read details from each order as it enters the system. Print details are added to the tail of the print queue, printed in sequence, and passed to the OCV. The rigid sequence of bottles and labels is maintained and any error is checked by the verification stage. Verified orders then leave the print system.

The PSC also monitors the progress of each bottle/label through the printer 34, OCV system 36 and out past the Verification PHS 40. If no new bottles enter the sub-system, then printing will stop once all the current labels have been printed. Due to the gap between the printer and the application point, this will result in several printed labels waiting on the print web, and several bottles waiting to be labeled. When a new bottle is seen, its label is printed (via the normal queuing mechanisms). This allows the label at the front of the web to be applied to its bottle.

The PSC provides no PAUSE facilities; as this can be achieved via the Labeler. However, the software controlling the PSC may be easily modified to provide a pause, if desired.

Once the last bottle enters the printer sub-system, no further bottles will arrive to flush the earlier ones out. Therefore, when all channels have stopped filling, the operator must command the PSC to enter its Empty Buffer state 1560. In this state, the PSC performs a number of functions, including: inhibiting the Labeler Input PHS from passing through any more bottles; commencing printing of blank labels to enable the previously printed labels on the web to be applied to the in-progress bottles; waiting for the last bottle to be seen by the Verification PHS; stopping printing blank labels; informing the FSC of completed/rejected orders as normal, and returning to the Standby state. This sequence of operations may be instigated by the operator at other times, for example in anticipation of the ribbon running out. Once it has completed, the PSC start-up sequence may be used to return to normal operation.

The PSC User Interface itself is minimal. The main Packaging Line user interface is at the FSC. The functions to be performed here include: error reporting and fixing dialogue, especially identification of bad labels on the web as above; controlling of FILL BUFFER and EMPTY BUFFER states; off-line uploading of new label images; off-line printing of OCV test images and display of simple process statistics. The User Interface requires a password to be entered before allowing access to the off-line facilities. No password is required for normal operation.

Orders are "acquired" by the Labeler Input PHS. This establishes the sequence of orders, and provides a sub-set of order data which is used to look-up and validate the full order information which is held in a database received from the FSC.

Based on the tablet feeding rates discussed hereinabove, it is contemplated that pucks will enter the system at a rate of 150/minute, although it is fully expected that with improved technology, fillers will have increased capabilities and that these rates will increase. Each puck will be read by a low-level controller (PHS) before proceeding into the high-security conveyor which leads to the label application point.

Like the FSC, the PSC database is organized on a per-channel basis, with each channel's data split into three separate areas. An Orders Received database includes a set of single-channel database files as received from the FSC. Each file has the full details for a number of orders. Individual orders are copied from the database as required and are marked as In Progress. Orders are marked as Completed once they have been successfully processed by the line. Files are added to this set by the FSC, and removed only when a new Channel Setup is started, so that a failure down-stream of the PSC will have a record at the PSC when it is retried. The PSC also records the drug type/strength, label selection, magic number etc. information for each channel; and the label size for the whole system.

The In Progress database is held in RAM and contains full working copies of all the orders which are in progress at the PSC. This is used to track the progress of each order through label printing, application and verification. Orders are added individually as they are extracted from the Orders Received database when the matching puck is read. Orders are removed individually when they are placed in the Orders Finished database when the order leaves the PSC, is rejected, or goes missing within the PSC.

The Orders Finished database is held in RAM pending transmission to the FSC when next polled. Only the data fields which need to be returned to the FSC are stored. Individual orders are added as they leave or are rejected.

As the print sequence must match exactly the sequence seen at the input, scheduling is dictated by the queue of orders seen by the Labeler Input PHS. This establishes the sequence for the Label printer. The only complexity is the start-up and shutdown considerations above. Orders are tracked at each stage of the printing process and recorded in the local database, in order to assist with error recovery. In fact, each order is noted several times during the process. For example, the order is seen at input, when the label print command is issued, when the label is OCV'd, and when the labeled bottle is seen at Verification PHS 40 (where it is identified as being OK or is rejected).

It is noted that, in the event of a catastrophic error, e.g. power-fail, the database at the PSC is not required, as the FSC will have a non-volatile record of bottles which have been completed.

The various functions performed by the PSC may be more simply implemented by decomposition of the control software into a number of software modules, as described below. The following thus gives an operational view of the PSC as a whole. Each of the modules is preferably implemented in C (though other languages may be used), with the exception of the PSC User Interface module which is implemented in Visual Basic.

A PSC Status/Control module handles the LAN side of the status and control messages to the FSC. It passes the line-control parameters from a PSC POLL to the PSC Line Control module, and the acknowledged orders to the PSC Scheduling/Control module. It builds the Printer Status message from status information from PSC Line Control, and finished/rejected orders from PSC Scheduling/Control.

A PSC Order Acquisition module is responsible for receiving database files from the FSC. It informs the PSC Database Server when the new file is received and is ready for use.

A PSC Database Server module provides the PSC Scheduling/Control module with random access to the Received Orders database. It maintains a look-ahead cache so that in-sequence orders will be processed immediately. It validates the partial order data which is received from the Labeler Infeed PHS against the database record, and returns the full database record for that order (or a fault).

A PSC Line Control module implements the PSC State Machine, maintains the database of Line and Channel status and production statistics, controls the Labeler and PHSs, and provides the Fault and Error handling facilities.

A PSC Scheduling/Control module controls the Printing, OCV and Labeling process. It receives single-bottle-order details from the Labeler Infeed PHS, obtains validated full order data from the PSC Database Server, and passes this to the Printer Driving module. It tracks the progress of each bottle through the print station, receiving OCV scan results from the SIO module, and detects any anomalies. It maintains the Orders In Progress and Orders Finished databases, providing the PSC Status/Control module with completed/rejected orders.

The PSC User Interface module implements the front end of the Printing system. It generates commands to the other modules from user input, and reflects the current state of the system onto the display.

A PSC Serial Drivers module handles all communications with the OCV and PHSs. It periodically scans the serial ports and reads messages, decodes and validates them, and sends them on to other modules. It buffers outgoing communications, implementing the PHS communications protocol.

A PSC Digital I/O module handles all digital I/O. It periodically scans the digital inputs and reports changes to the Labeler Control module. It provides facilities for other modules to write digital outputs, and records the current settings. It is responsible for toggling the PHS watchdog lines.

A PSC Printer Driving module controls the Label Printer. When it receives new channel setup details, it selects the appropriate Label design and downloads the fixed data to the printer. It uses the Variable Field Template to produce the correct print strings for each label to be printed, and once printed passes the information to the Serial I/O module for transmission to the OCV system.

A PSC capable of operating as above described to execute the foregoing functions may be implemented using a hardware configuration including the following components:

- An IBM Compatible PC rack mounted 486 DX2 66 Mhz PC with 16 Mbyte RAM
- A high-performance 800*600 graphics accelerator
- A 14" rack mounted touch screen
- A 500 Mbyte hard disc
- An Advantech PC-LabCard 8-port Intelligent RS232 Interface Card with RS422 adapter
- A Blue Chip Digital I/O Card and
- An IBM 16/4 Token Ring Adapter II, set for 16 Mbit operation.

The Print Station Controller does not have a separate E-Stop circuit. There is an E-Stop circuit on the labeler, however.

A TEC B572 Thermal Transfer printer is contemplated for use in the system, which is capable of printing at up to 8"/sec at 300 dpi, fitted with the optional 1 Mbyte FLASH RAM card for downloading graphics as custom fonts. The printer is interfaced to the PSC by a standard Centronix port.

Data

For the sake of completeness, the following describes the customer specific information provided to the HLC database for each order by a supervisor, via an appropriate input device. It should be understood that the following data structures are simply ilustrative and not restrictive, as other structures and formats may be used to achieve the inventive concept.

An edit checking function is provided for assuring validity of the data entered, including any appropriate check for the data entered, such as numeric range check, data format, data check, and alphanumeric check. The specific information is provided from the specific sources in specific data fields kept on the database, at field byte lengths appropriate to maintaining the specific information provided therein.

| DATA | TYPE | SOURCE |
|---|---|---|
| System Bottle Number | [Numeric] | System |
| Customer Order Number | [Text data] | Operator |
| Customer Order Bottle Total (The total number "N" of bottles in the customer order, this may consist of several drug types) | [Numeric] | Operator |
| Customer Order Sequence Number (The nth bottle in the order) | [Numeric] | System |
| Customer Order Drug Total (The total number of bottles of this drug type in the order) | [Numeric] | Operator |
| Generic Drug Name | [Text] | Drug database |
| Product Strength | [Text] | Drug database |
| Brand Name | [Text] | Drug database |
| Product Code | [Text] | Drug database |
| Fill Quantity | [Numeric] | Operator |
| Bottle Size | [Enumerated] | Bottle database |
| Label size | [Enumerated] | Label database |
| Cap Type | [Enumerated] | Cap database |
| Barcode Data (Data to be printed as a barcode) | [Text] | System |
| Variable Data Field Checksum | [Byte array] | Operator |

An example of a patient specific Variable Data Field is shown below:

| | |
|---|---|
| Patient First Name | [Text] |
| Patient Middle Initial | [Text] |
| Patient Last Name | [Text] |
| Patient Title (Mr., Mrs., . . .) | [Text] |
| Patient Name Suffix (Jr., Sr., III.) | [Text |
| Dr. First Name | [Text] |
| Dr. Middle Name | [Text] |
| Dr. Last Name | [Text] |
| Patient Street Address #1 | [Text] |
| Patient Street Address #2 | [Text] |
| Patient City | [Text] |
| Patient State | [Text] |
| Patient Zip Code | [Text] |
| Dosage Instructions | [Text] |
| Interaction Information | [Text] |
| Patient Counseling | [Enumerated] |
| Refill Information | [Numeric] |
| Co-Pay amount | [Numeric] |

The above shown variable data field is a block of a predetermined number of bytes, which can be configured into a number of subfields by the operator, on a per channel basis. The order data is configurable, enabling the use of optional data elements. The database is thus sufficiently flexible to accommodate patient (e.g., consumer) specific orders, customer specific orders and standard packaging orders.

An appropriate label input format is used, e.g., as established in known label design software such as Etiquette, to enable operator selection of label data to identify bottle size and label size for example. Time and channel-setup data are also inputted by the operator, including a designation of bottle size, label size, as well as product name, strength, and channel number. By inputting data relating to the above named information, the inventive system permits grouping of orders to be sent to the packaging line, where the data is associated with the RF label of the puck to be read by the FSC and filled. The FSC confirms completion of order filling by sending data identifying the following information.

| System-unique bottle Number | [Numeric] |
| Customer Order Number | [Text] |
| Customer Order Sequence Number | [Numeric] |
| Product Code | [Text] |
| Fill Quantity | [Numeric] |
| Cap Type | [Enumerated] |
| Barcode Data | [Text] |
| Variable Data Field Checksum | [Numeric] |
| Lot | [Text] |
| Expiration Date | [Text] |
| Order Status | [Boolean] |
| Date Filled | [Text] |
| Time Filled | [Text] |

Conclusion

In accordance with the foregoing description, there has thus been disclosed a product packaging line having a capability of packaging small, individualized, product quantities with individualized labels applied thereto, reflecting a retailer's name and logo or specialized barcode data such as expiry date. As a result, expensive intermediate inventories of product become unnecessary, as is a system for complex forward market forecasting, inasmuch as it becomes possible simply to pack the orders as received. The supply chain is thus greatly simplified, enhancing freshness of product, and permitting both a reduction in the price paid by a consumer and an increase in the margin which may be retained by a manufacturer or supplier.

It should be clear that any components identified herein as suitable for implementing the invention are only those which, based on presently available technology, are contemplated as being capable of implementing the various functions of the system components. Thus, as technology evolves, various of the system elements may be more easily or more appropriately implemented by other components and, indeed, it is possible that functions hereinabove described as being implemented by several components will be more readily implemented by a single component.

The foregoing description of the preferred embodiment of the invention has been presented for purposes of illustration and description. It is not intended to be exhaustive or to limit the invention to the precise forms disclosed, since many modifications or variations thereof are possible in light of the above teaching. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

What is claimed is:

1. In an automated container filling system, including a container input station and a container filling station, the improvement comprising:

fill control means for controlling the container filing station to fill any of a plurality of containers with any of a plurality of medications, and a plurality of tag means each capable of containing medication order information, a respective one of said tag means associated with each respective container for conveying respective order information for the respective container to said fill control means, said fill control means operating in response to said respective order information from said respective tag means by controlling the container filling station to fill the respective container associated with said respective tag means with a respective medication prescribed in the respective order;

wherein each said tag means comprises data storage means for storing respective order data, and container retaining means for retaining a container respectively corresponding to said respective order data stored in said data storage means, and for transporting the container to and from the container filling station.

2. An automated container filling system as recited in claim 1, further comprising:

system data transmitting means for communicating respective order data to each said respective tag means and system data reading means for reading said respective order data from one of said tag means, wherein each said tag means comprises:

data storage means for storing respective order data from said system data transmitting means;

tag data receiving means for receiving said respective order data from said data communication means and tag data transmitting means for transmitting said respective order data from said data storage means of said tag means to said system data reading means.

3. An automated container filling system as recited in claim 1, wherein the plurality of containers include containers having a plurality of different sizes, and said plurality of tag means include a plurality of different container retaining means respectively corresponding to the different sizes of the plurality of containers, each said different container retaining means configured for positioning the respectively corresponding container retained thereby at a predetermined distance from a filler nozzle of the container filling station.

said different container retaining means including structure for causing the predetermined distance to be substantially identical for each differently sized container, thereby to enable a single container filling station to fill a plurality of differently sized containers.

4. An automated container filling system as recited in claim 3, wherein each said tag means comprises first and second portions, said first portion including said data storage means and said second portion connected thereto including a respective one of said different container retaining means.

5. An automated container filling system as recited in claim 1, wherein each said tag means comprises first and second portions connected to each other, said first portion including data storage means for storing said respective order information for the respective container, and said second portion including a container retaining means for retaining the respective container and for transporting the respective container to and from the container filling station.

6. An automated container filling system as recited in claim 5, wherein said first and second portions of each said tag means are releasably connected to each other.

7. An automated container filling system as recited in claim 1, further comprising:
a plurality of tag handling stations for verifying operations implemented by the system and to reject a tag at an earliest opportunity.

8. An automated container filling system as recited in claim 2, wherein said plurality of tag handling stations are each substantially identically programmed, and include customizing means for modifying operation under a program to implement selectable functions.

9. An automated container filling system as recited in claim 1, wherein each said tag means comprises data storage means for storing said respective order information for the respective container, and a container retaining means for retaining the respective container and for transporting the respective container,
further comprising routing means for routing a tag means and the respective container retained thereby in accordance with information stored in said data storage means.

10. An automated container filling system as recited in claim 1, wherein each said tag means comprises data storage means for storing said respective order information for the respective container,
further comprising routing means for routing a filled container in accordance with information stored in said data storage means.

11. An automated container filling system as recited in claim 1, further comprising:
a plurality of tag handling stations for verifying operations implemented by the system and for rejecting a tag at an earliest opportunity,
said tag handling stations including a post-filling station for matching said container specific information with said respective order and for rejecting the tag and container associated therewith upon a mismatch.

12. An automated container filling system as recited in claim 11, further comprising capping means for capping a container associated with respective tag means, and wherein:
said tag handling stations include a post-capping handling station for matching said respective order with said container specific data and for rejecting the tag and container associated therewith upon a mismatch.

13. An automated container filling system as recited in claim 12, wherein said capping means comprises a plurality of capping stations, and wherein said post-filling station handling station further comprises diverting means for diverting respective tags and associate containers to respective ones of said capping stations in accordance with said data from said data storage means thereof.

14. An automated container filling system as recited in claim 13, further comprising labeling means for individually labeling a respective container associated with a respective tag means in accordance with said respective order and wherein:
said tag handling stations include a post-labeling handling station for:
matching a label produced by said labeling means for said respective container with said respective order and with said identifying data, and
for rejecting the respective tag and respective container associated therewith upon any mismatch.

15. An automated container filling system as recited in claim 1; further comprising routing means for routing a tag means and the respective container retained thereby based on information generated in accordance with said data stored in said data storage means.

* * * * *

UNITED STATES PATENT AND TRADEMARK OFFICE
CERTIFICATE OF CORRECTION

PATENT NO.     : 6,522,945 B2
DATED          : February 18, 2003
INVENTOR(S)    : Nicholas J. Sleep et al.

It is certified that error appears in the above-identified patent and that said Letters Patent is hereby corrected as shown below:

<u>Title page,</u>
Item [75], Inventors, change "Rahway" to -- Whitehouse Station --

Signed and Sealed this

Seventh Day of October, 2003

JAMES E. ROGAN
*Director of the United States Patent and Trademark Office*